(12) United States Patent
Gotschall et al.

(10) Patent No.: US 10,598,508 B2
(45) Date of Patent: Mar. 24, 2020

(54) SYSTEMS AND METHODS FOR EMS NAVIGATION USER INTERFACE

(75) Inventors: Robert H. Gotschall, Thornton, CO (US); Michael S. Erlich, Erie, CO (US); James Seymour McElroy, Jr., Boulder, CO (US)

(73) Assignee: ZOLL Medical Corporation, Chelmsford, MA (US)

( * ) Notice: Subject to any disclaimer, the term of this patent is extended or adjusted under 35 U.S.C. 154(b) by 711 days.

(21) Appl. No.: 13/467,859

(22) Filed: May 9, 2012

(65) Prior Publication Data
US 2013/0124090 A1 May 16, 2013

Related U.S. Application Data

(60) Provisional application No. 61/484,121, filed on May 9, 2011.

(51) Int. Cl.
*G06F 3/00* (2006.01)
*G01C 21/36* (2006.01)

(52) U.S. Cl.
CPC ................... *G01C 21/3664* (2013.01)

(58) Field of Classification Search
CPC .... G06F 3/00; G06F 19/3418; G06F 19/3468; G06F 3/048; G06F 19/324; G06F 19/3456; G06F 3/0416; G06F 2203/04101; G06F 2221/2111; G06F 16/9537; G06F 1/00; G06F 21/6218; G06F 3/0488; G06F 3/04883; G06F 19/3481; G06F 1/163; G06F 1/1635; G06F 1/3231; G06F 1/3287; G06F 21/43; G06F 21/6245; G06F 2200/1637; G06F 2203/04803; G06F 2203/04806;
(Continued)

(56) References Cited
U.S. PATENT DOCUMENTS

| 5,085,224 A | 2/1992 | Galen et al. |
| 5,224,485 A | 7/1993 | Powers et al. |

(Continued)

FOREIGN PATENT DOCUMENTS

| WO | WO2006086089 A1 | 8/2006 |
| WO | 2011011454 A1 | 1/2011 |

OTHER PUBLICATIONS

International Search Report and Written Opinion issued in PCT/US2012/037148, dated Oct. 9, 2012, 68 pages.
(Continued)

*Primary Examiner* — Di Xiao
(74) *Attorney, Agent, or Firm* — Finch & Maloney PLLC

(57) ABSTRACT

A method for interfacing with a user of an EMS navigation system according to embodiments of the present invention includes displaying on a device screen a series of display screens that are navigationally linked by a series of navigation buttons, wherein the series of display screens comprises a home screen, and wherein each display screen of the series of display screens comprises a home button linking to the home screen, wherein each navigation button of the series of navigation buttons appearing in a display screen of the series of display screens is larger than any other buttons in the display screen, and wherein each navigation button of the series of navigation buttons appearing on the display screen of the series of display screens is adjacent to a left edge or a right edge of the device screen.

37 Claims, 25 Drawing Sheets

(58) Field of Classification Search
CPC ... G06F 2203/04808; G06F 2221/2141; G06F 3/04817; G06F 3/0482; G06F 3/04842; G06F 3/04886; G06F 8/00; G06F 9/453
USPC .......................................... 715/702, 853, 854
See application file for complete search history.

(56) References Cited

U.S. PATENT DOCUMENTS

| | | | |
|---|---|---|---|
| 5,319,363 A | 6/1994 | Welch et al. | |
| 5,333,617 A | 8/1994 | Hafner | |
| 5,494,051 A | 2/1996 | Schneider, Sr. | |
| 5,511,553 A | 4/1996 | Segalowitz | |
| 5,544,661 A | 8/1996 | Davis et al. | |
| 5,549,659 A | 8/1996 | Johansen et al. | |
| 5,586,024 A * | 12/1996 | Shaibani ............... | G06F 19/324 600/300 |
| 5,593,426 A | 1/1997 | Morgan et al. | |
| 5,782,878 A | 7/1998 | Morgan et al. | |
| 6,117,073 A | 9/2000 | Jones et al. | |
| 6,141,584 A | 10/2000 | Rockwell et al. | |
| 6,321,113 B1 | 11/2001 | Parker et al. | |
| 6,390,996 B1 | 5/2002 | Halperin et al. | |
| 6,398,744 B2 | 6/2002 | Bystrom et al. | |
| 6,405,083 B1 | 6/2002 | Rockwell et al. | |
| 6,405,238 B1 * | 6/2002 | Votipka ............. | G06F 17/30873 707/E17.013 |
| 6,481,887 B1 | 11/2002 | Mirabella | |
| 6,532,381 B2 | 3/2003 | Bayer et al. | |
| 6,604,115 B1 | 8/2003 | Gary et al. | |
| 6,681,003 B2 | 1/2004 | Linder et al. | |
| 6,727,814 B2 | 4/2004 | Saltzstein et al. | |
| 6,747,556 B2 | 6/2004 | Medema et al. | |
| 6,827,695 B2 | 12/2004 | Palazzolo et al. | |
| 6,829,501 B2 | 12/2004 | Nielsen et al. | |
| 6,937,150 B2 | 8/2005 | Medema et al. | |
| 6,957,102 B2 | 10/2005 | Silver et al. | |
| 6,993,386 B2 | 1/2006 | Lin et al. | |
| 7,006,865 B1 | 2/2006 | Cohen et al. | |
| 7,118,542 B2 | 10/2006 | Palazzolo et al. | |
| 7,120,488 B2 | 10/2006 | Nova et al. | |
| 7,122,014 B2 | 10/2006 | Palazzolo et al. | |
| 7,129,836 B2 | 10/2006 | Lawson et al. | |
| 7,162,306 B2 | 1/2007 | Caby et al. | |
| 7,231,258 B2 | 6/2007 | Moore et al. | |
| 7,233,905 B1 | 6/2007 | Hutton et al. | |
| 7,295,871 B2 | 11/2007 | Halperin et al. | |
| 7,412,395 B2 | 8/2008 | Rowlandson | |
| 7,444,315 B2 | 10/2008 | Wu | |
| 7,650,291 B2 | 1/2010 | Rosenfeld et al. | |
| 8,314,683 B2 * | 11/2012 | Pfeffer ................. | G08B 25/006 340/7.3 |
| 8,375,402 B2 * | 2/2013 | Majewski et al. ........... | 719/323 |
| 8,566,923 B2 * | 10/2013 | Fredette et al. ................ | 726/19 |
| 2001/0044732 A1 | 11/2001 | Maus et al. | |
| 2002/0004729 A1 | 1/2002 | Zak et al. | |
| 2004/0077995 A1 | 4/2004 | Ferek-Petric et al. | |
| 2004/0119683 A1 * | 6/2004 | Warn ..................... | B60K 37/06 345/156 |
| 2005/0277872 A1 | 12/2005 | Colby, Jr. et al. | |
| 2006/0009809 A1 | 1/2006 | Marcovecchio et al. | |
| 2006/0149597 A1 | 7/2006 | Powell et al. | |
| 2006/0229802 A1 * | 10/2006 | Vertelney et al. ............ | 701/200 |
| 2006/0287586 A1 | 12/2006 | Murphy | |
| 2007/0021125 A1 * | 1/2007 | Zhu ....................... | H04W 4/029 455/456.1 |
| 2007/0100213 A1 | 5/2007 | Dossas et al. | |
| 2007/0118038 A1 | 5/2007 | Bodecker et al. | |
| 2007/0203742 A1 | 8/2007 | Jones et al. | |
| 2007/0255120 A1 | 11/2007 | Rosnov | |
| 2007/0265772 A1 * | 11/2007 | Geelen ........................ | 701/208 |
| 2007/0276300 A1 | 11/2007 | Olson et al. | |
| 2007/0299689 A1 | 12/2007 | Jones et al. | |
| 2008/0018454 A1 | 1/2008 | Chan et al. | |
| 2008/0126134 A1 | 5/2008 | Jones et al. | |
| 2009/0063187 A1 | 3/2009 | Johnson et al. | |
| 2009/0177981 A1 * | 7/2009 | Christie ............... | G06F 3/04883 715/758 |
| 2009/0222539 A1 | 9/2009 | Lewis et al. | |
| 2009/0303531 A1 * | 12/2009 | Abe ....................... | G06Q 30/02 358/1.15 |
| 2010/0020033 A1 * | 1/2010 | Nwosu ................ | G06F 3/04883 345/173 |
| 2010/0184453 A1 * | 7/2010 | Ohki ..................... | G01C 21/362 455/456.3 |
| 2010/0298899 A1 | 11/2010 | Donnelly et al. | |
| 2011/0161852 A1 * | 6/2011 | Vainio ................. | G06F 3/04842 715/769 |
| 2011/0172550 A1 * | 7/2011 | Martin ................. | A61B 5/7445 600/523 |
| 2011/0175930 A1 * | 7/2011 | Hwang ................. | G06F 3/0481 345/629 |
| 2011/0295078 A1 * | 12/2011 | Reid et al. ..................... | 600/300 |
| 2012/0198547 A1 * | 8/2012 | Fredette et al. ................ | 726/19 |

OTHER PUBLICATIONS

Chu, Yuechun et al., "A Mobile Teletrauma System Using 3G Networks," IEEE Transactions on Information Technology in Biomedicine, vol. 9, No. 4, Dec. 2004.

Correspondence from Barry Chapin to Benjamin Fernandez dated Jan. 7, 2013.

Mandel, Resuscitating the User Experience: A Touchscreen System for EMS and Fire Rescue Professionals, User Experience Magazine, vol. 6, Issue 4, 2007.

Pahlavan, Kaveh et al., An Overview of Wireless Indoor Geolocation Techniques and Systems, C.G. Omidyar (Ed.): MWCN 2000, LNCS 1818, pp. 1-13, Springer-Verlag Berlin Heidelberg 2000.

Poor, Robert, "Wireless Mesh Networks," Sensors, Feb. 1, 2003, retrieved on Aug. 2, 2012 from http://www.sensorsmag.com/networking-communications/standards-protocols/wireless-mesh-networks-968.

Zoorob, Roger J., "Acute Dyspnea in the Office," American Family Physician, Nov. 1, 2003, retrieved on Aug. 2, 2012 from http://www.aafp.org/afp/2003/1101/p1803.html?printable=afp .

Zoll Data Systems, "RescueNet Navigator Brochure," 2008 (2 pages).

* cited by examiner

FIG. 7

Navigator - ALS1 (brittingham)
Dispatch (1 of 5) - Scene
EnRoute

Incident Number: 2
Run Number: 27203
Pickup Time: 4/28/2011 1:32:45 PM
Nature: Allergies / Envenomations
Call Type: BLS
Pro QA Determinant: 06E01
Map Page:

Hunt Lawrence B
101 SW Main St
Portland, OR 97204
(503) 226-1162
Emergency

Incident Summary

Incident Number 1
Nature Heat / Cold Exposure
Call Type Pre-Scheduled
Pro QA Determinant 06E01
Map Page Thurber Kent B
1300 SW 5th Ave
Portland, OR 97201
(503) 241-2300

Emergency

FIG. 16

SYSTEMS AND METHODS FOR EMS NAVIGATION USER INTERFACE

CROSS-REFERENCE TO RELATED APPLICATIONS

This application claims the benefit of U.S. Provisional Patent Application Ser. No. 61/484,121, filed on May 9, 2011, which is incorporated by reference herein in its entirety for all purposes.

TECHNICAL FIELD

Embodiments of the present invention relate generally to user interface systems, and more particularly to user interface systems for emergency medical services (EMS) navigation systems.

BACKGROUND

Current user interface systems for EMS devices typically include rather small navigation buttons spread out in various locations on the user's screen. For workers in the EMS field, particularly workers who interact with patients in a mobile environment, such complicated user interface setups with small buttons often require the workers to devote larger amounts of time to finding the correct button, and/or often divert the workers' attention or vision from the EMS situation (e.g. patient care or driving conditions) to focus on navigating the user interface. For example, an ambulance driver who is using an EMS navigation system may need to stop the vehicle in order to divert the necessary attention to activating navigation commands in an EMS navigation device. EMS navigation interfaces which include small buttons spread out in various locations on the user's screen detract the EMS technician's attention from other more valuable targets during an EMS response event.

SUMMARY

A method for interfacing with a user of an EMS navigation system according to embodiments of the present invention includes displaying on a device screen a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is substantially the same size and larger than other buttons in the display screen, and wherein each navigation button of the series of navigation buttons appearing in the display screen of the series of display screens is adjacent to a left edge or a right edge of the device screen to facilitate use by EMS users.

A method for interfacing with a user of an EMS navigation system according to embodiments of the present invention includes displaying on a device screen a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is larger than any other buttons in the display screen, and wherein each navigation button of the series of navigation buttons appearing on the display screen of the series of display screens is adjacent to a left edge or a right edge of the device screen. A user may toggle or cycle through two or more of the series of display screens by selecting a toggle button which has a same position on the device screen in each of the two or more of the series of display screens.

A method for interfacing with a user of an EMS navigation system according to embodiments of the present invention includes receiving an incident assignment from a dispatcher corresponding to an EMS incident, displaying an easy response button with a device touchscreen, wherein the easy response button has an area substantially as large as the device touchscreen, detecting a user's touch on the easy response button on the device touchscreen, and based on the detection of the user's touch, updating a status of the EMS navigation system to indicate that response is being made.

The method of the previous paragraph, further including, based on the detection of the user's touch, automatically displaying a map with a route to a target destination corresponding to the EMS incident.

The method of the either of the previous two paragraphs, wherein updating a status of the EMS navigation system to indicate that response is being made includes starting a response timer.

The method of any of the of the previous three paragraphs, wherein displaying the easy response button includes displaying a timer indicating a time since the incident assignment was received from the dispatcher.

The method of any of the previous four paragraphs, wherein displaying the easy response button includes displaying a nature of the EMS incident.

The method of any of the previous five paragraphs, wherein displaying the easy response button includes displaying a location of the EMS incident.

A system for EMS navigation according to embodiments of the present invention includes a touch screen display device, the touch screen display device configured to display information related to EMS navigation and to accept tactile input from a user, the touch screen configured to display a series of display screens that are navigationally linked by a series of navigation buttons, wherein the series of display screens comprises a home screen, wherein each display screen of the series of display screens comprises a home button linking to the home screen, wherein each navigation button of the series of navigation buttons appearing in a display screen of the series of display screens is larger than any other buttons on the display screen, and wherein each navigation button of the series of navigation buttons appearing in the display screen of the series of display screens is adjacent to a left edge or a right edge of the device screen.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

BRIEF DESCRIPTION OF THE DRAWINGS

FIG. 7 illustrates a first dispatch screen of an EMS navigation system, according to embodiments of the present invention.

Figure 8:
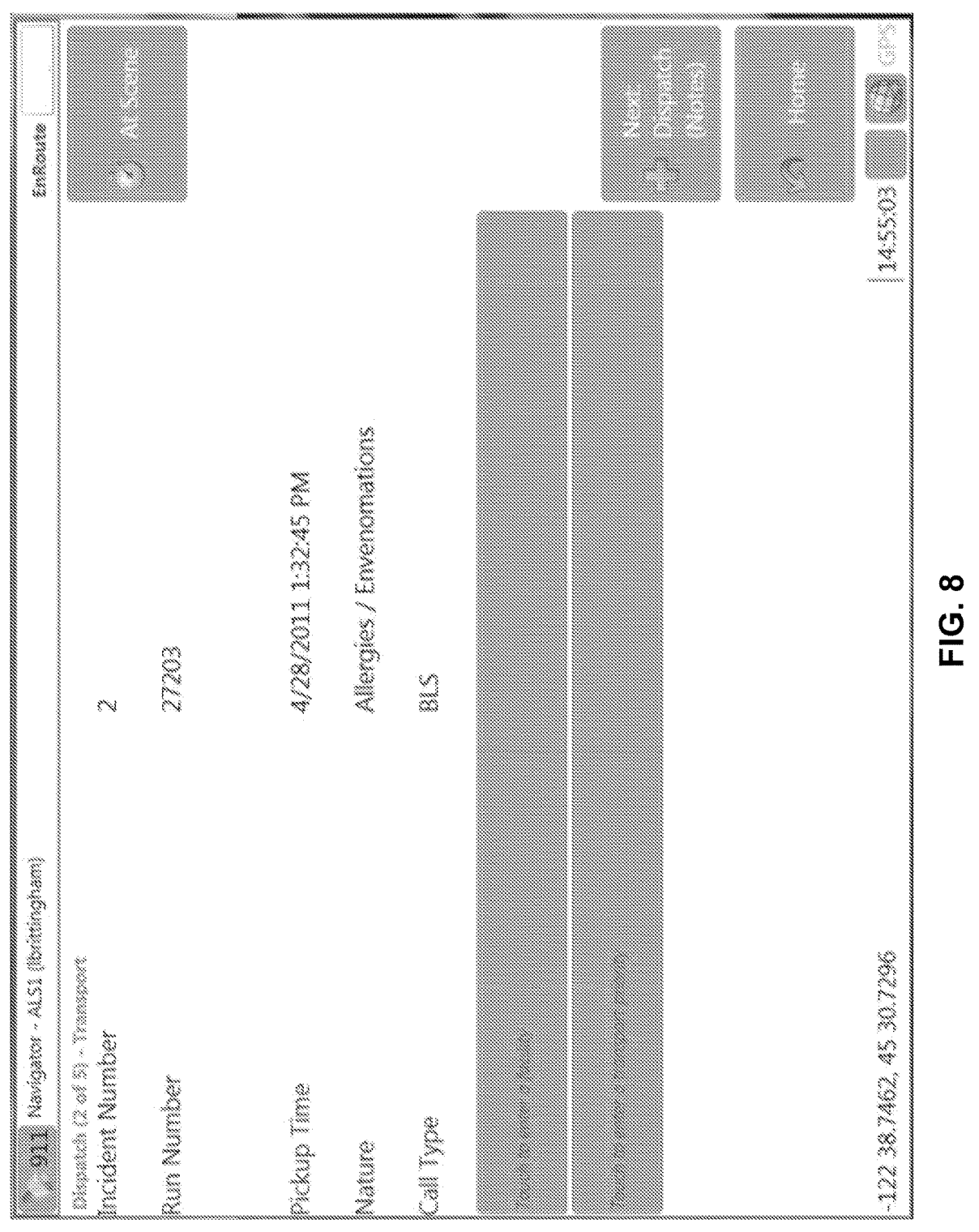

FIG. 8 illustrates a second dispatch screen of an EMS navigation system, according to embodiments of the present invention.

Figure 10:
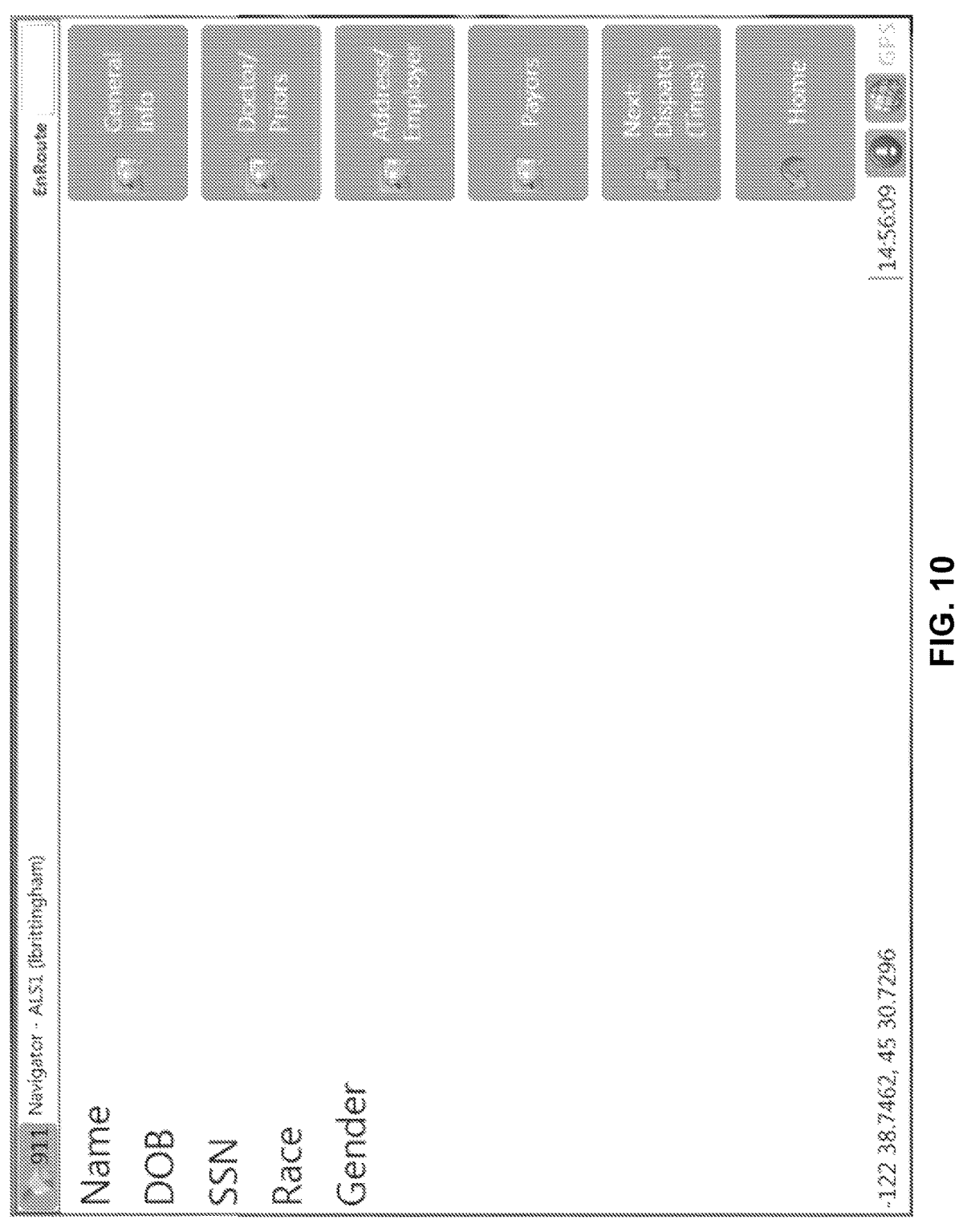

FIG. 10 illustrates a fourth dispatch screen of an EMS navigation system, according to embodiments of the present invention.

Figure 11:
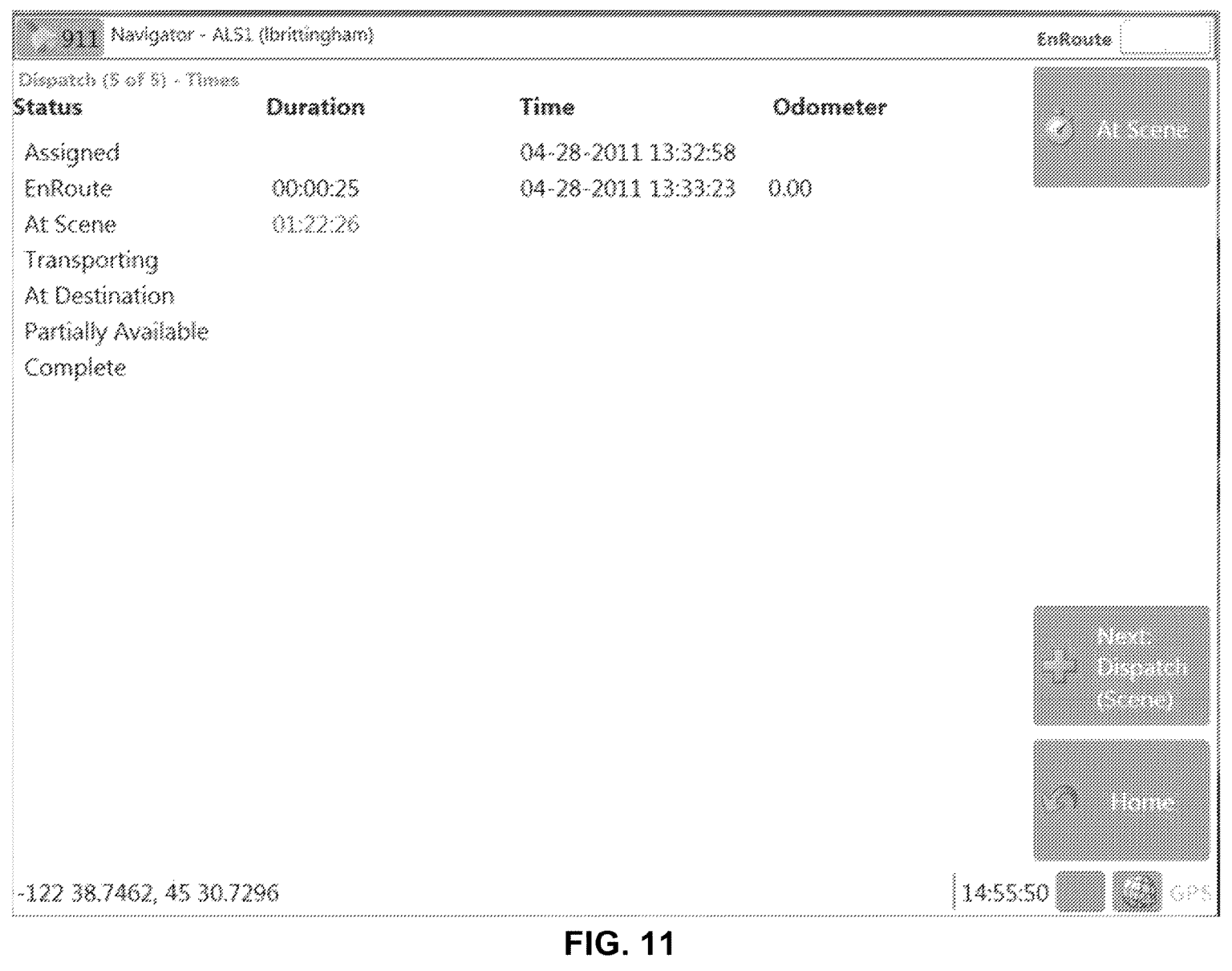

FIG. 11 illustrates a fifth dispatch screen of an EMS navigation system, according to embodiments of the present invention.

FIG. 16 illustrates a work selection screen of an EMS navigation system, according to embodiments of the present invention.

Figure 1:
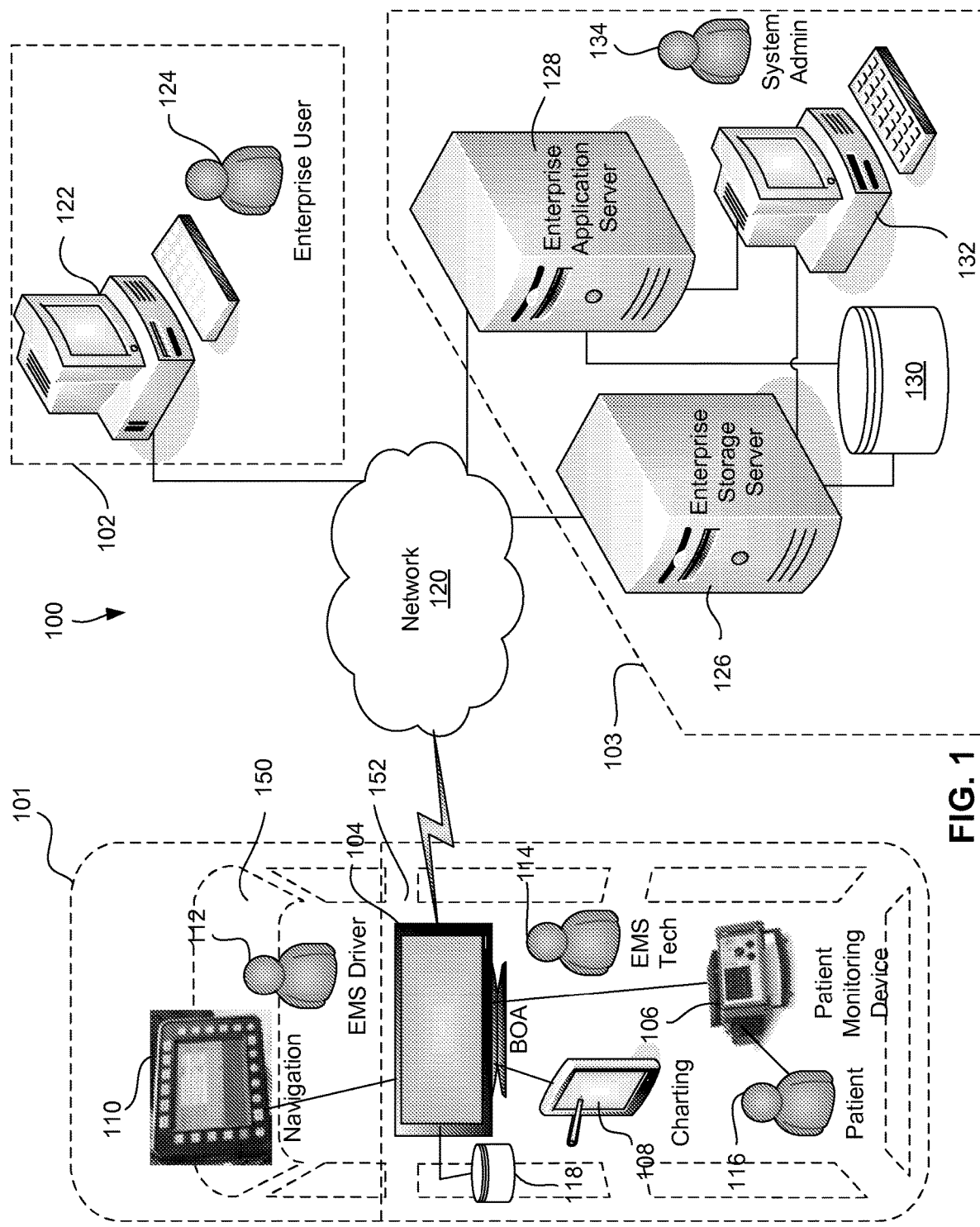
FIG. 1 illustrates a system for mobile and enterprise user real-time display of medical information collected from multiple different EMS devices, according to embodiments of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

As illustrated in FIG. 1, a system 100 according to embodiments of the present invention performs advanced data management, integration and presentation of EMS data from multiple different devices. System 100 includes a mobile environment 101, an enterprise environment 102, and an administration environment 103. Devices within the various environments 101, 102, 103 may be communicably coupled via a network 120, such as, for example, the Internet. System 100 is further described in Patent Cooperation Treaty Application Publication No. WO 2011/011454, published on Jan. 27, 2011, which is incorporated herein by reference in its entirety for all purposes.

As used herein, the phrase "communicably coupled" is used in its broadest sense to refer to any coupling whereby information may be passed. Thus, for example, communicably coupled includes electrically coupled by, for example, a wire; optically coupled by, for example, an optical cable; and/or wirelessly coupled by, for example, a radio frequency or other transmission media. "Communicably coupled" also includes, for example, indirect coupling, such as through a network, or direct coupling.

According to embodiments of the present invention, the mobile environment 101 is an ambulance or other EMS vehicle—for example a vehicular mobile environment (VME). The mobile environment may also be the local network of data entry devices as well as diagnostic and therapeutic devices established at time of treatment of a patient or patients in the field environment—the "At Scene Patient Mobile Environment" (ASPME). The mobile environment may also be a combination of one or more of VMEs and/or ASPMEs. The mobile environment may include a navigation device 110 used by the driver 112 to track the mobile environment's position 101, locate the mobile environment 101 and/or the emergency location, and locate the transport destination, according to embodiments of the present invention. The navigation device 110 may include a Global Positioning System ("GPS"), for example. The navigation device 110 may also be configured to perform calculations about vehicle speed, the travel time between locations, and estimated times of arrival. According to embodiments of the present invention, the navigation device 110 is located at the front of the ambulance to assist the driver 112 in navigating the vehicle. The navigation device 110 may be, for example, a RescueNet® Navigator onboard electronic data communication system available from Zoll Data Systems of Broomfield, Colo.

As illustrated in FIG. 1, a patient monitoring device 106 and a patient charting device 108 are also often used for patient care in the mobile environment 101, according to embodiments of the present invention. The EMS technician 114 attaches the patient monitoring device 106 to the patient 116 to monitor the patient 116. The patient monitoring device 106 may be, for example, a defibrillator device with electrodes and/or sensors configured for attachment to the patient 116 to monitor heart rate and/or to generate electrocardiographs ("ECG's"), according to embodiments of the present invention. The patient monitoring device 106 may also include sensors to detect or a processor to derive or calculate other patient conditions. For example, the patient monitoring device 106 may monitor, detect, treat and/or derive or calculate blood pressure, temperature, respiration rate, blood oxygen level, end-tidal carbon dioxide level, pulmonary function, blood glucose level, and/or weight, according to embodiments of the present invention. The patient monitoring device 106 may be a Zoll E-Series® defibrillator available from Zoll Medical Corporation of Chelmsford, Mass., according to embodiments of the present invention. A patient monitoring device may also be a patient treatment device, or another kind of device that includes patient monitoring and/or patient treatment capabilities, according to embodiments of the present invention.

The patient charting device 108 is a device used by the EMS technician 114 to generate records and/or notes about the patient's 116 condition and/or treatments applied to the patient, according to embodiments of the present invention. For example, the patient charting device 108 may be used to note a dosage of medicine given to the patient 116 at a particular time. The patient charting device 108 and/or patient monitoring device 106 may have a clock, which may be synchronized with an external time source such as a network or a satellite to prevent the EMS technician from having to manually enter a time of treatment or observation (or having to attempt to estimate the time of treatment for charting purposes long after the treatment was administered), according to embodiments of the present invention. The patient charting device 108 may also be used to record biographic and/or demographic and/or historical information about a patient, for example the patient's name, identification number, height, weight, and/or medical history, according to embodiments of the present invention. According to embodiments of the present invention, the patient charting device 108 is a tablet PC, such as for example the TabletPCR component of the RescueNet® ePCR Suite available from Zoll Data Systems of Broomfield, Colo. According to some embodiments of the present invention, the patient charting device 108 is a wristband or smartphone such as an Apple iPhone or iPad with interactive data entry interface such as a touch screen or voice recognition data entry that may be communicably connected to the BOA device 104 and tapped to indicate what was done with the patient 116 and when it was done.

The navigation device 110, the charting device 108, and the monitoring device 106 are each separately very useful to the EMS drivers 112 and technicians 114 before, during, and after the patient transport. A "back of ambulance" ("BOA") device 104 receives, organizes, stores, and displays data from each device 108, 110, 112 to further enhance the usefulness of each device 108, 110, 112 and to make it much easier for the EMS technician 114 to perform certain tasks that would normally require the EMS technician 114 to divert visual and manual attention to each device 108, 110, 112 separately, according to embodiments of the present invention. In other words, the BOA device centralizes and organizes information that would normally be de-centralized and disorganized, according to embodiments of the present invention.

The BOA device 104 is communicably coupled to the patient monitoring device 106, the patient charting device 108, and the navigation device 110, according to embodiments of the present invention. The BOA device 104 is also communicably coupled to a storage medium 118. The BOA device 104 may be a touch-screen, flat panel PC, and the storage medium 118 may be located within or external to the BOA device 104, according to embodiments of the present invention. The BOA device 104 may include a display template serving as a graphical user interface, which permits the user (e.g. EMS tech 114) to select different subsets and/or display modes of the information gathered from and/or sent to devices 106, 108, 110, according to embodiments of the present invention.

Some embodiments of the present invention include various steps, some of which may be performed by hardware components or may be embodied in machine-executable instructions. These machine-executable instructions may be used to cause a general-purpose or a special-purpose processor programmed with the instructions to perform the steps. Alternatively, the steps may be performed by a combination of hardware, software, and/or firmware. In addition, some embodiments of the present invention may be performed or implemented, at least in part (e.g., one or more modules), on one or more computer systems, mainframes (e.g., IBM mainframes such as the IBM zSeries, Unisys ClearPath Mainframes, HP Integrity NonStop servers, NEC Express series, and others), or client-server type systems. In addition, specific hardware aspects of embodiments of the present invention may incorporate one or more of these systems, or portions thereof.

Figure 2:
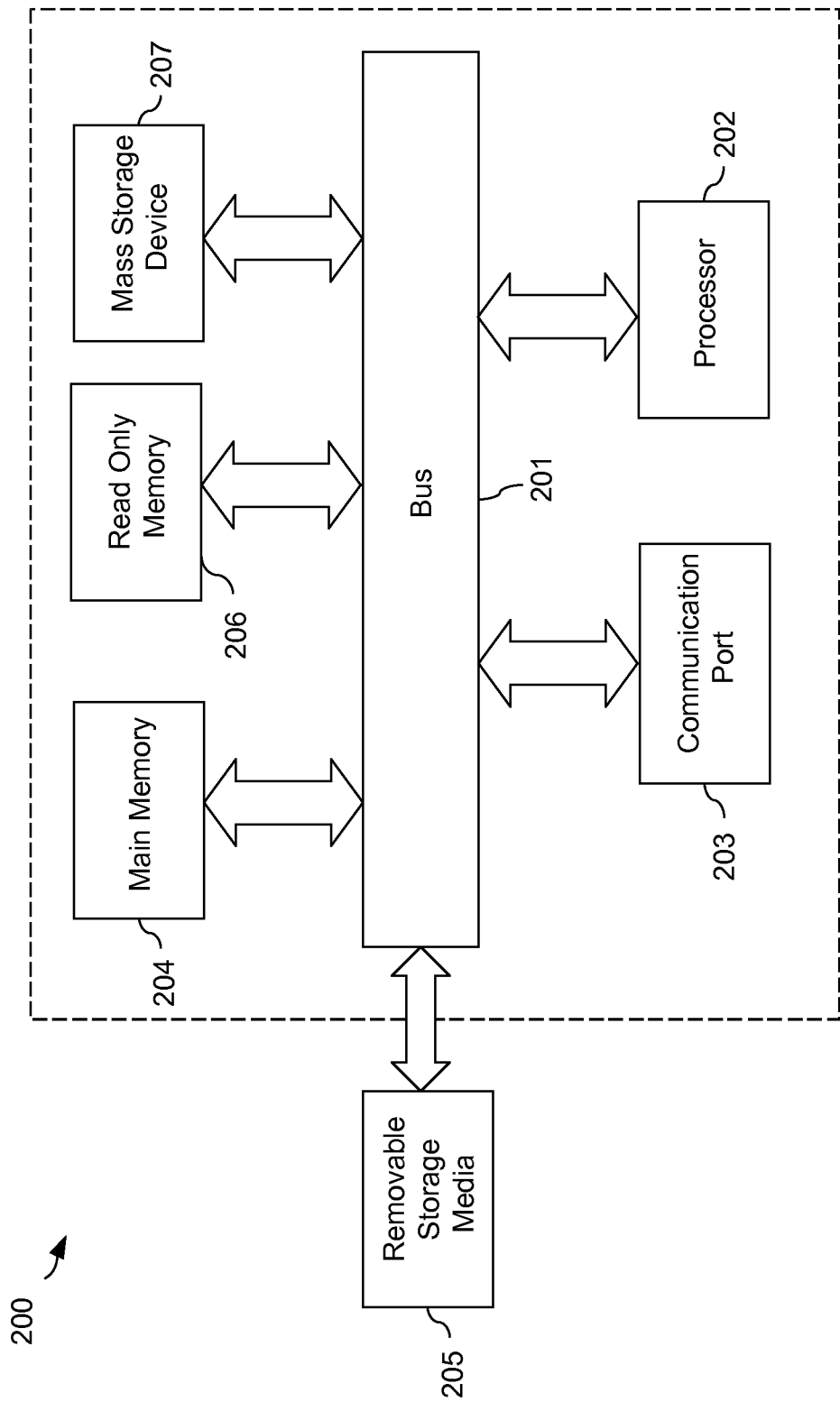
FIG. 2 illustrates an exemplary computer system, according to embodiments of the present invention.

As such, FIG. 2 is an example of a computer system 200 with which embodiments of the present invention may be utilized. According to the present example, the computer system includes a bus 201, at least one processor 202, at least one communication port 203, a main memory 24, a removable storage media 205, a read only memory 206, and a mass storage 207.

Processor(s) 202 can be any known processor, such as, but not limited to, an Intel® Itanium® or Itanium 2® processor(s), or AMD® Opteron® or Athlon MP® processor(s), or Motorola® lines of processors. Communication port(s) 203 can be any of an RS-232 port for use with a modem based dialup connection, a 10/100 Ethernet port, or a Gigabit port using copper or fiber, for example. Communication port(s) 203 may be chosen depending on a network such a Local Area Network (LAN), Wide Area Network (WAN), or any network to which the computer system 200 connects. Main memory 204 can be Random Access Memory (RAM), or any other dynamic storage device(s) commonly known to one of ordinary skill in the art. Read only memory 206 can be any static storage device(s) such as Programmable Read Only Memory (PROM) chips for storing static information such as instructions for processor 202, for example.

Mass storage 207 can be used to store information and instructions. For example, hard disks such as the Adaptec® family of SCSI drives, an optical disc, an array of disks such as RAID (e.g. the Adaptec family of RAID drives), or any other mass storage devices may be used, for example. Bus 201 communicably couples processor(s) 202 with the other memory, storage and communication blocks. Bus 201 can be a PCI/PCI-X or SCSI based system bus depending on the storage devices used, for example. Removable storage media 205 can be any kind of external hard-drives, floppy drives, flash drives, IOMEGA® Zip Drives, Compact Disc-Read Only Memory (CD-ROM), Compact Disc-Re-Writable (CD-RW), or Digital Video Disk-Read Only Memory (DVD-ROM), for example. The components described above are meant to exemplify some types of possibilities. In no way should the aforementioned examples limit the scope of the invention, as they are only exemplary embodiments.

Figure 3:
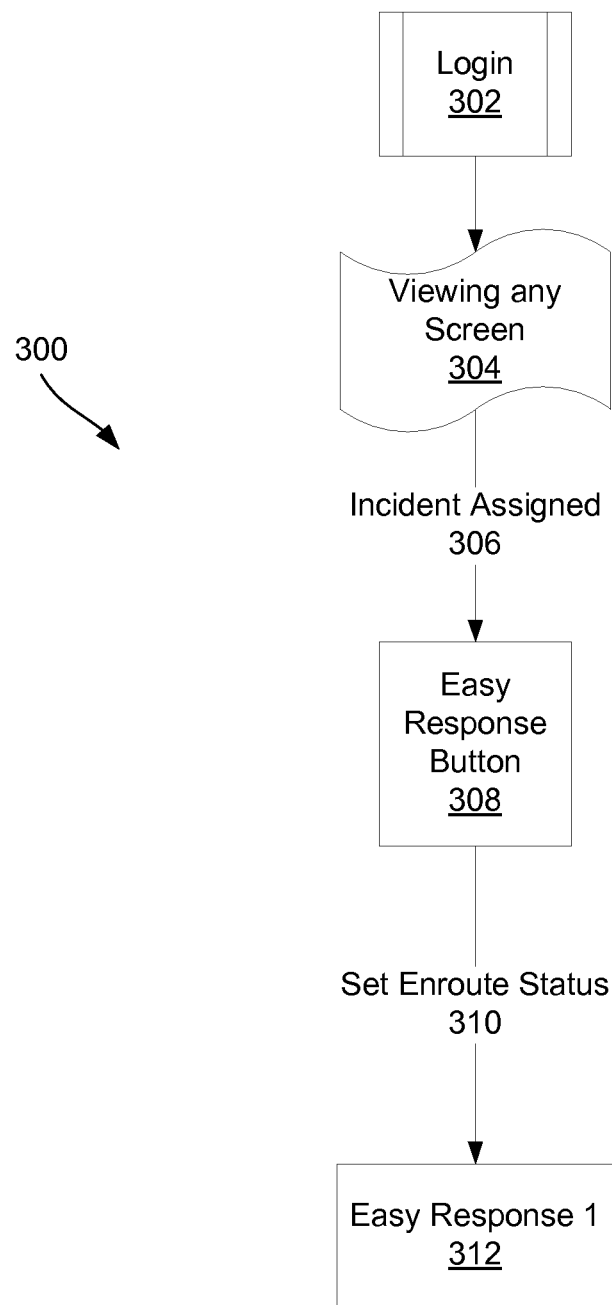
FIG. 3 depicts a flow diagram illustrating an activation of response status through use of an easy response button, according to embodiments of the present invention.
Figure 5:
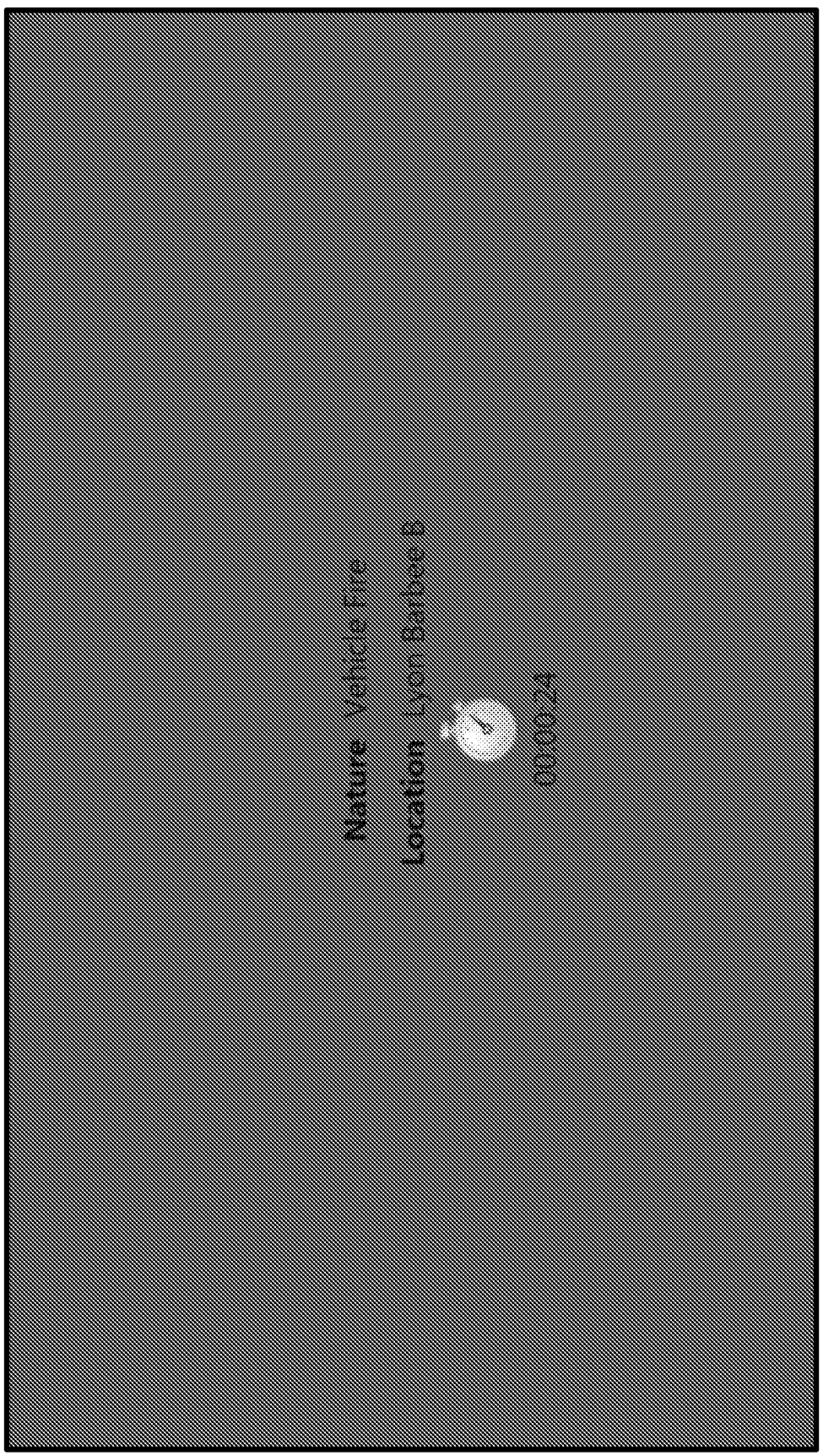
FIG. 5 illustrates an easy response button display screen, according to embodiments of the present invention.

FIG. 3 depicts a flow diagram 300 illustrating an activation of response status through use of an easy response button, according to embodiments of the present invention. First, a user logs in to the system by providing information about the individual and/or entering authentication or credential information (block 302). At the login screen, the user may input, select, or otherwise specify information such as specific company, username, and/or password, according to embodiments of the present invention. The user may be viewing any screen of the navigation device 110 (block 304), and when an incident is assigned to the particular vehicle or crew with which navigation device 110 is associated (block 306), the entire screen of the display device screen of navigation device 110 may be turned into an easy response button, which is illustrated in FIG. 5. The easy response button screen of FIG. 5 may list the nature of the assigned incident (e.g. "Vehicle Fire") and/or the location of the incident (e.g. "Lyon Barbee B" or "Main Street Café") and/or a time that has elapsed since the incident was assigned to the particular crew.

As used herein, the word "screen" is used in some instances to refer to the physical display device capable of displaying images, for example the display device incorporated with navigation system 110 (e.g. "device screen"), and in other instances to refer to the image, for example the particular pattern of colors, buttons, text, arrangement, and/or other visual appearance, displayed on the device screen (e.g. "display screen"). For example, FIGS. 5 through 25 illustrate display screens, while device 110 of FIG. 1 shows a device screen.

The screen of navigation device 110 may be a touch screen device or a device with similar operational characteristics, to permit tactile gestures to be used to indicate selections on the screen. By touching or tapping anywhere on the screen of FIG. 5, the user activates the easy response button (block 308), after which the status of the particular vehicle or crew is set to "en route" or the like (block 310), and the display screen is changed to the easy response screen illustrated in FIG. 12. Although a particular workflow for an incident assignment is described, other workflows may be achieved with navigation device 110.

Figure 4:
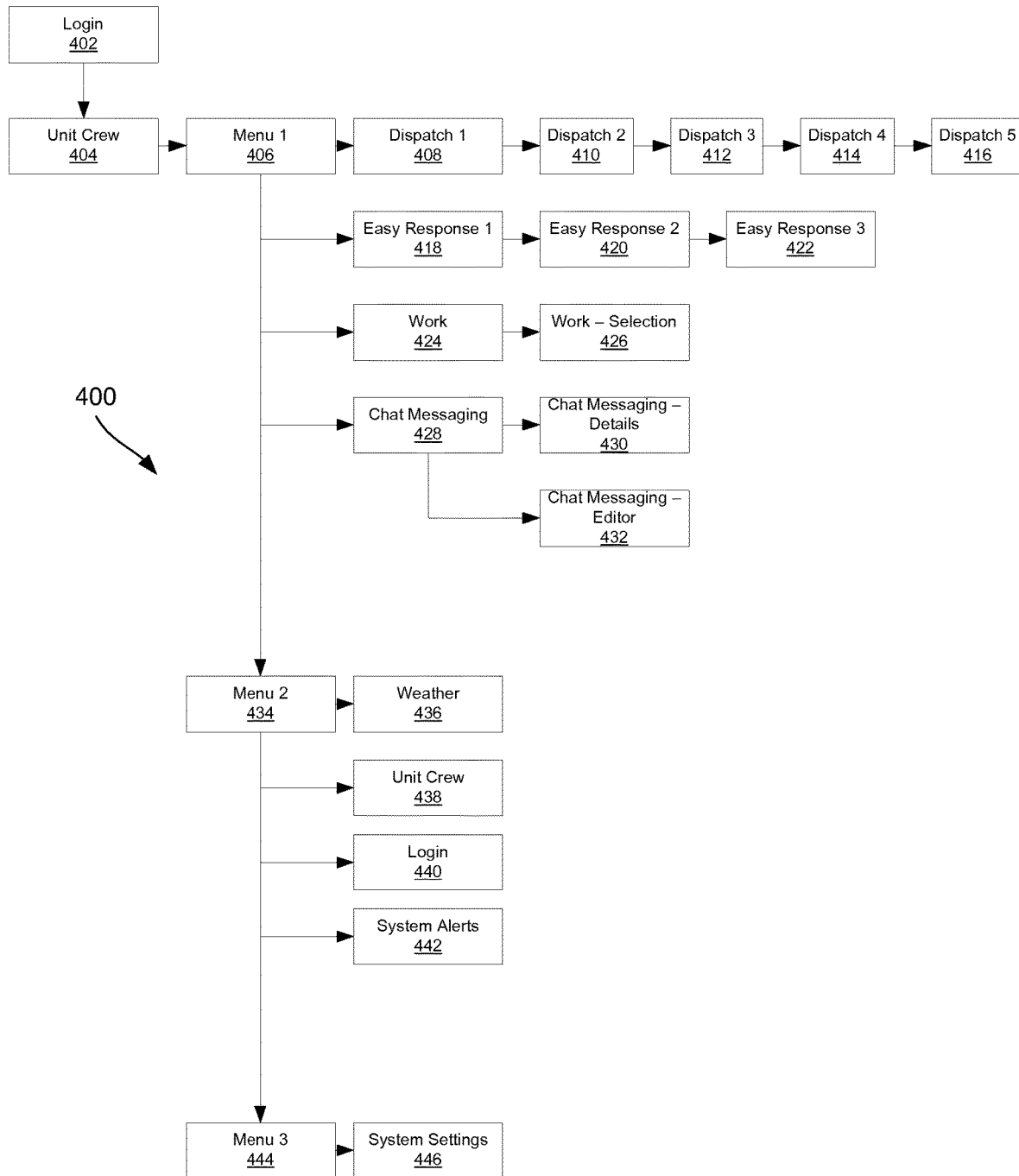
FIG. 4 illustrates a navigational linking relationship between display screens of an EMS navigation device, according to embodiments of the present invention.
Figure 22:
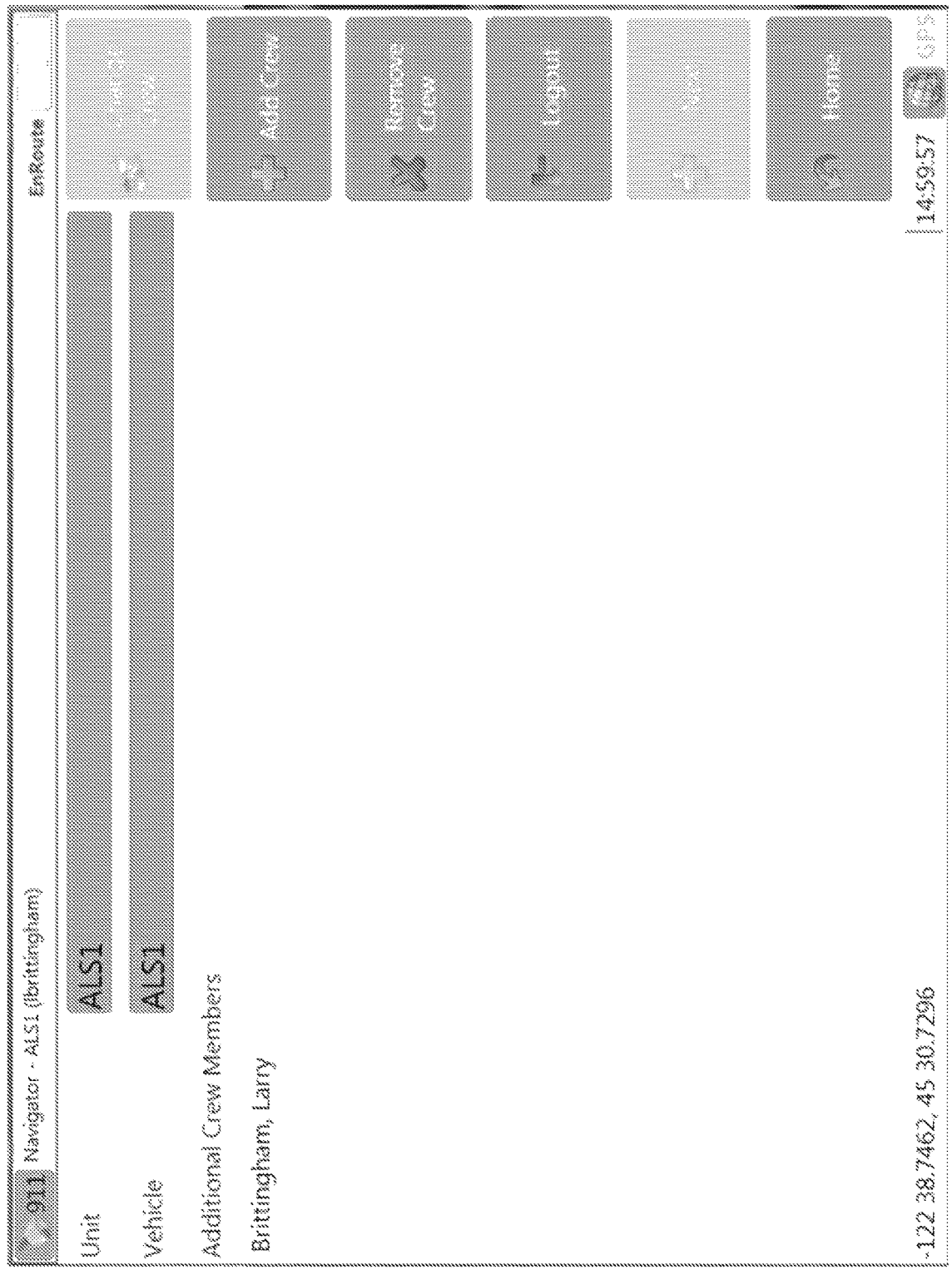
FIG. 22 illustrates a unit crew screen of an EMS navigation system, according to embodiments of the present invention.
Figure 23:
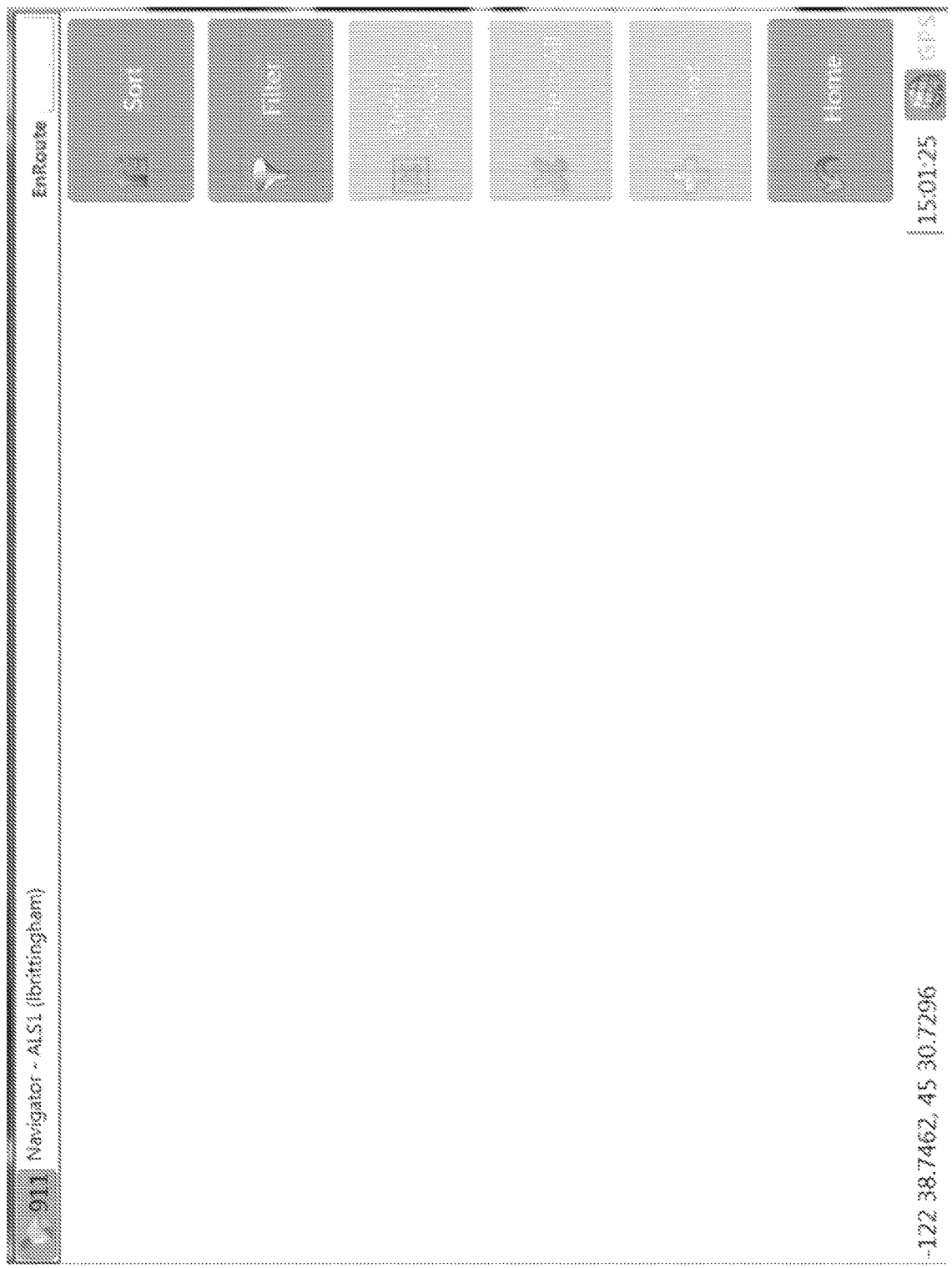
FIG. 23 illustrates a system alerts screen of an EMS navigation system, according to embodiments of the present invention.

FIG. 4 illustrates a navigational linking relationship map 400 between display screens of an EMS navigation device 110, according to embodiments of the present invention. At login screen 402, a user logs in to the system by providing information about the individual and/or entering authentication or credential information. At the login screen 402, the user may input, select, or otherwise specify information such as specific company, username, and/or password, according to embodiments of the present invention. At the unit crew screen 404, an example of which is illustrated at FIG. 22, the user may specify the vehicle, unit, and/or additional crew members for the unit for which the navigation system 110 will receive incident assignments and messages, according to embodiments of the present invention.

Figure 6:
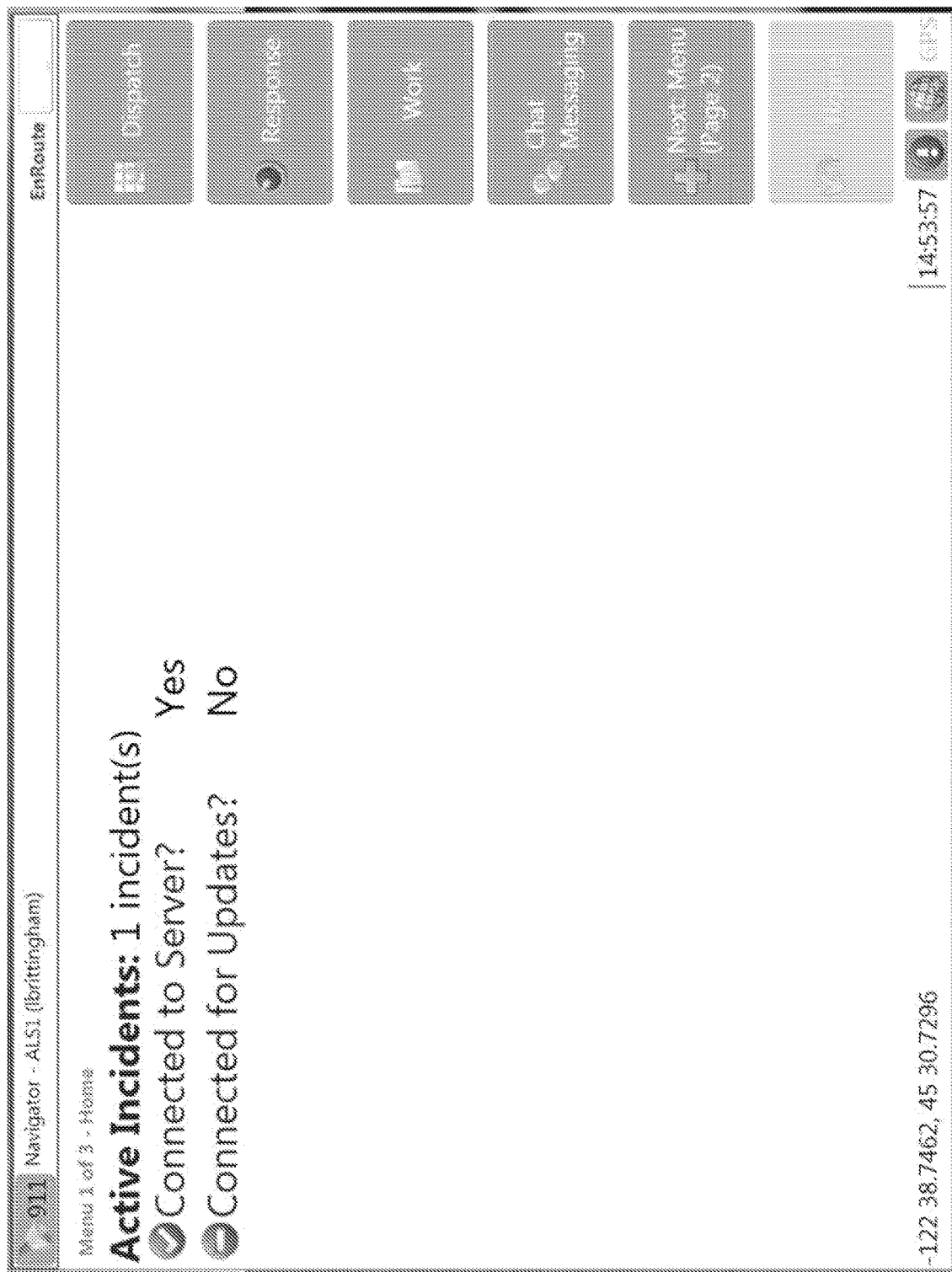
FIG. 6 illustrates a home screen of an EMS navigation system, according to embodiments of the present invention.
Figure 9:
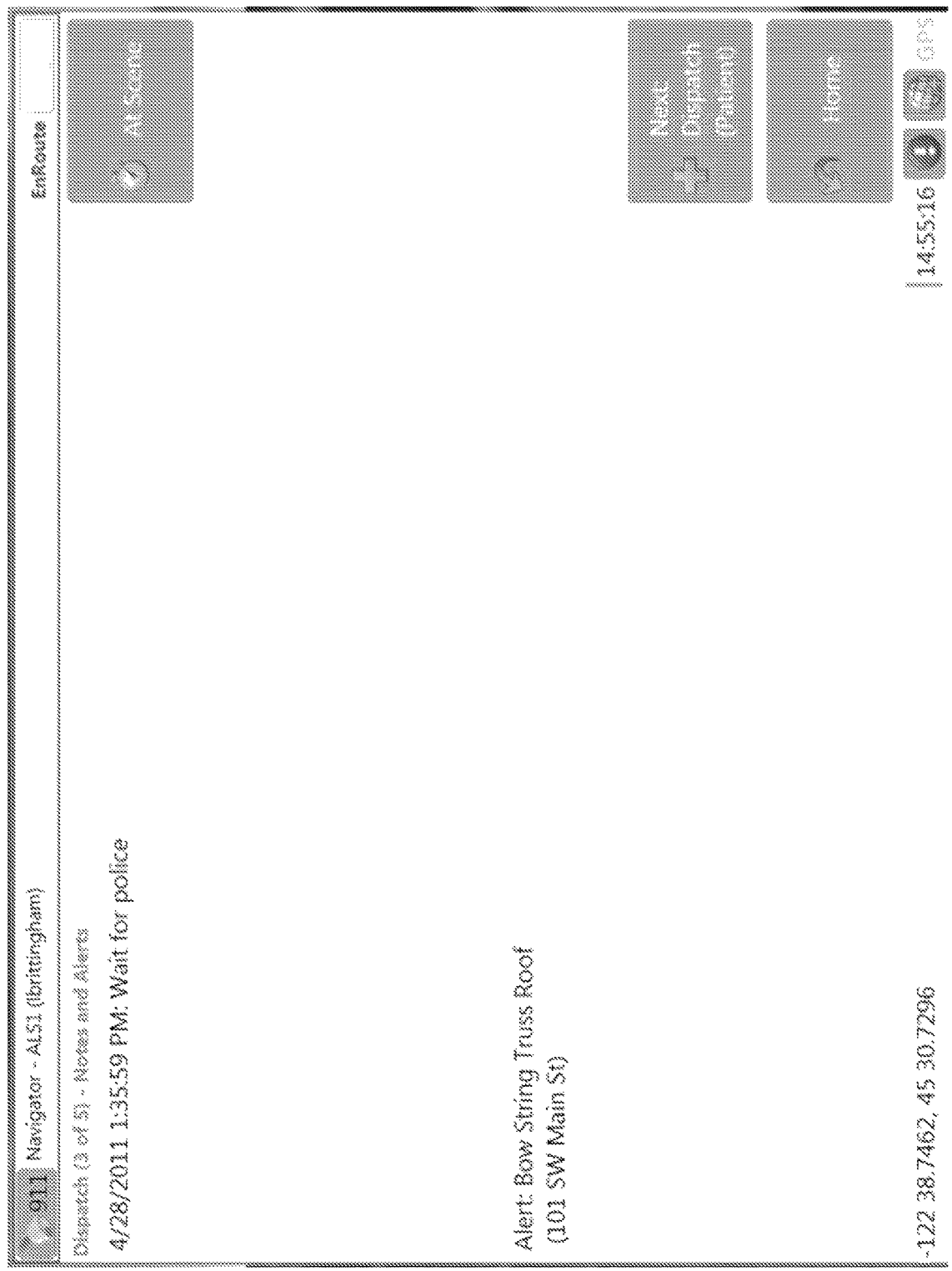
FIG. 9 illustrates a third dispatch screen of an EMS navigation system, according to embodiments of the present invention.

At the first menu screen 406, which is illustrated at FIG. 6, a user may select additional screens and/or functionality to view. For example, a user may select the Dispatch button to view the dispatch screen(s) of FIGS. 7 to 11, the Response button to view the easy response screen(s) of FIGS. 12 to 14, the Work button to view the work screen(s) of FIGS. 15 and 16, and the Chat Messaging button to view the chat messaging screen(s) of FIGS. 17 to 19. Clicking on the Next: Menu (Page 2) button will take the user to the second menu screen of FIG. 20.

Clicking on the Dispatch button from the home screen 406 takes the user to the first dispatch screen 408, illustrated in FIG. 7. The screen of FIG. 7 displays information about incident identifiers and type, and/or the location for the incident, for example the incident to which the ambulance is responding. From this screen 408, clicking on the "Next Dispatch" button takes the user to the second dispatch screen 410, illustrated at FIG. 8, which also displays information about the incident identifiers and type, and/or the transport location for the incident. Clicking on the Next Dispatch button from screen 410 navigationally links the user to a third dispatch screen 412, illustrated in FIG. 9, which displays notes and alerts for the incident. The notes may include any entries added by dispatch throughout the lifecycle of the particular incident, according to embodiments of the present invention. Clicking on the Next Dispatch button from screen 412 navigationally links the user to a fourth dispatch screen 414, illustrated in FIG. 10, which displays patient information for the patient associated with the incident. This may include patient characteristics, referring doctor, prior incidents, home address, employer information, and/or payor information, according to embodiments of the present invention. Clicking on the Next Dispatch button from screen 414 takes the user to a fifth dispatch screen 416, illustrated in FIG. 11, which displays all time stamps entered for the incident, and/or duration on each unit status for the incident, according to embodiments of the present invention.

Figure 12:
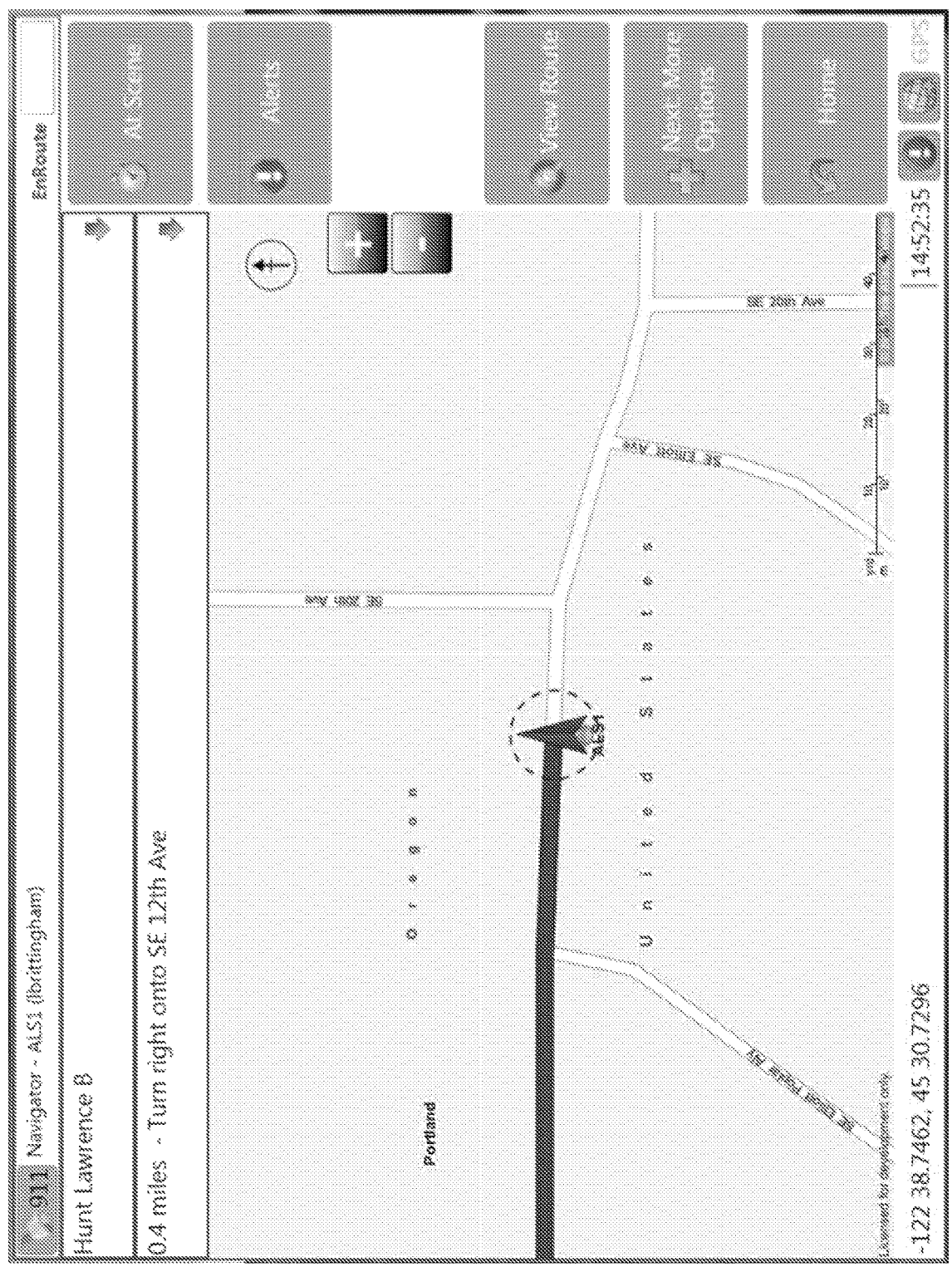
FIG. 12 illustrates a first easy response screen of an EMS navigation system, according to embodiments of the present invention.
Figure 13:
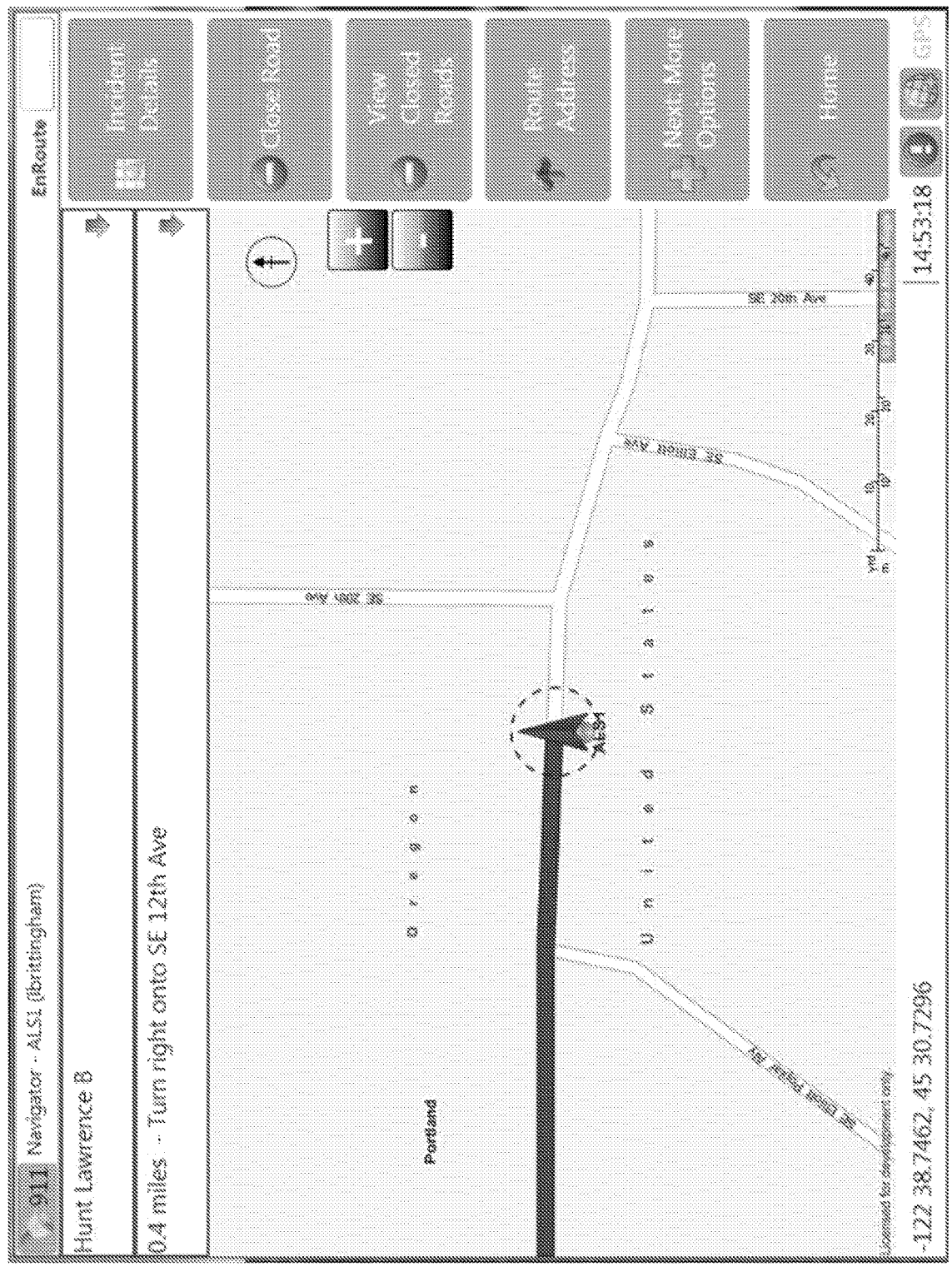
FIG. 13 illustrates a second easy response screen of an EMS navigation system, according to embodiments of the present invention.
Figure 14:
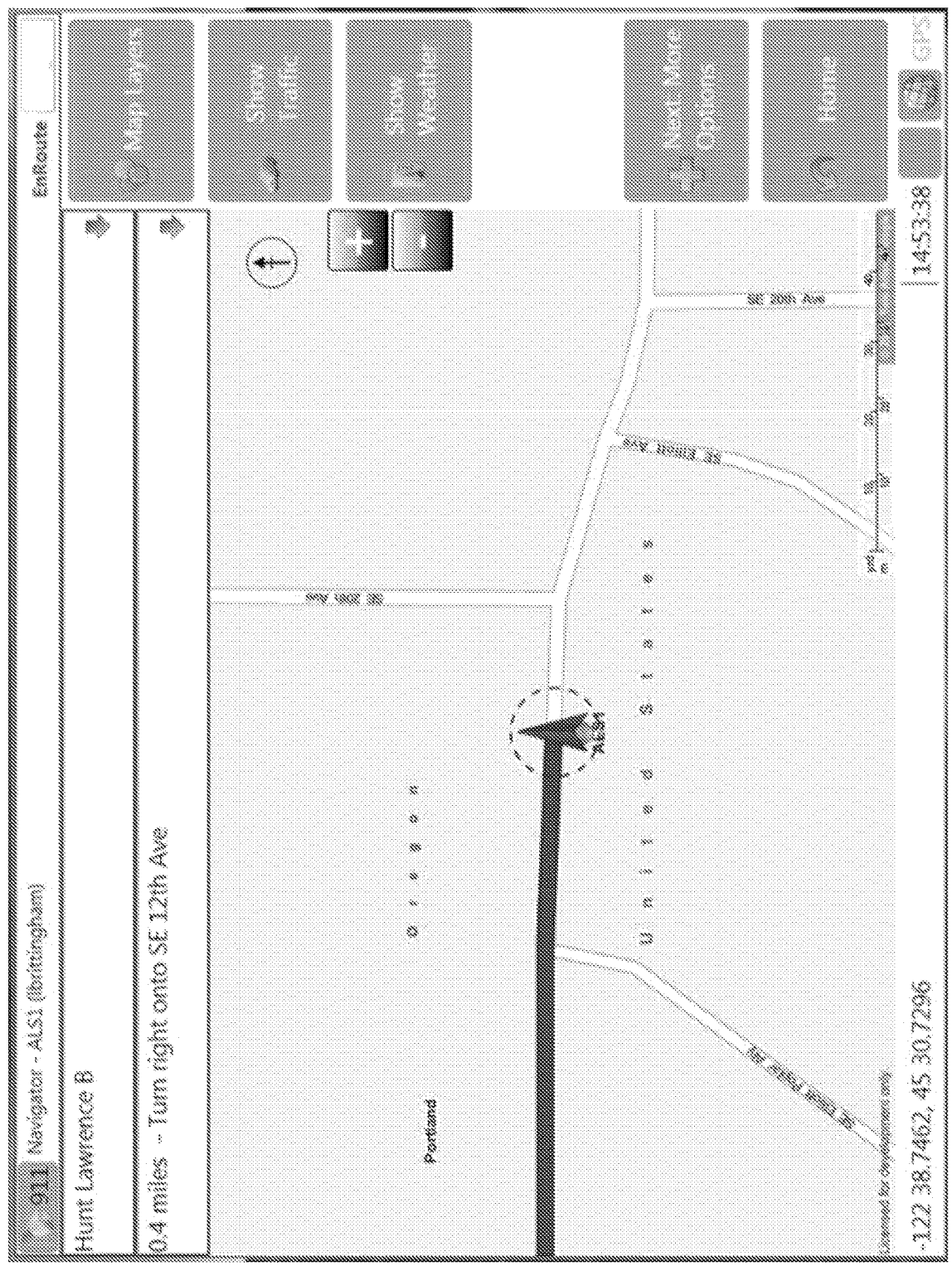
FIG. 14 illustrates a third easy response screen of an EMS navigation system, according to embodiments of the present invention.

From the home menu 406, selecting the Response button takes the user to easy response screen 418, which is illustrated at FIG. 12. Screen 418 displays a map with a route to the target destination, including address and directions. This screen 418 allows for setting time stamps for the incident, viewing alerts, viewing notes, and/or toggling the map view (for example between zooming to the destination location, viewing the entire route, and following the vehicle on the map), according to embodiments of the present invention. According to some embodiments of the present invention, the toggle button used to toggle between views is in the same location with respect to the display screen device in each of the two or three or more views, to facilitate easy and rapid toggling and/or cycling between the various kinds of views, without having to locate and select a different button for each view. Selecting the Next button from screen 418 takes the user to a second easy response screen 420, as illustrated in FIG. 13, which displays a second set of commands available on the easy response screen. These additional commands include switching to the dispatch screen 408 to view the incident details (Incident Details button), closing a road on the map, viewing a list of road closures, and/or routing to a custom address, according to embodiments of the present invention. Selecting the Next button from screen 420 takes the user to a third easy response screen 422, illustrated at FIG. 14, which displays a third set of commands including specifying which map layers to display on the map (Map Layers button), toggling traffic overlay on the map (Show Traffic button), and toggling weather overlay on the map (Show Weather button), according to embodiments of the present invention.

Figure 15:
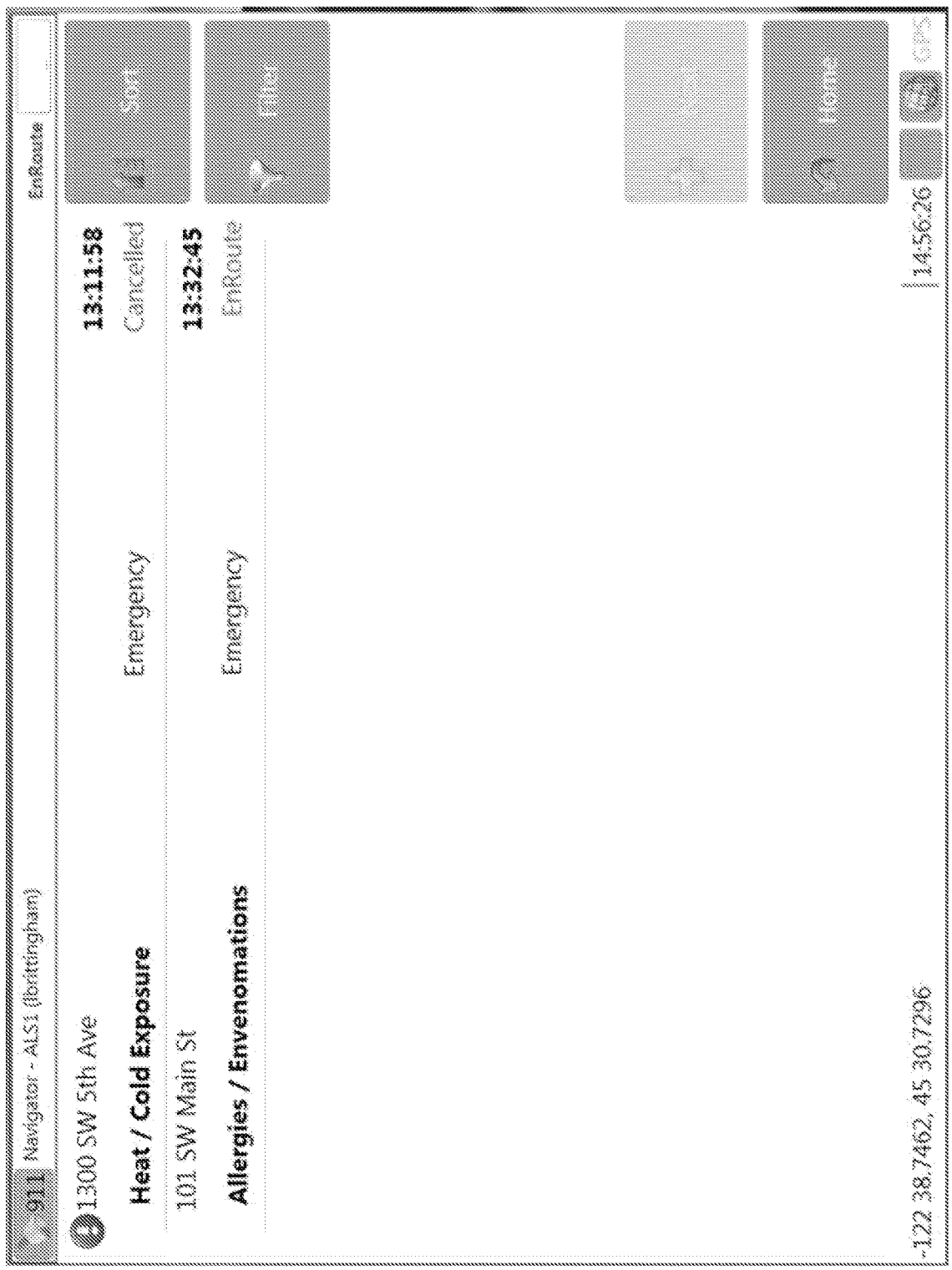
FIG. 15 illustrates a work screen of an EMS navigation system, according to embodiments of the present invention.

From the home menu 406, selecting the Work button takes the user to work screen 424, illustrated at FIG. 15, which displays a set of incidents that have been assigned to the unit throughout the shift, including open and completed incidents, according to embodiments of the present invention. Selecting a particular item from the incidents listed on screen 424 takes the user to work selection screen 426, illustrated at FIG. 16, which shows a summary of the selected incident in the content area, and allows the user to navigate to the dispatch screen 408 (View Full Details button) to view the full incident details, or to the easy response screen 418 (Route to Scene button) showing a route between the unit and the incident location, according to embodiments of the present invention.

Figure 17:
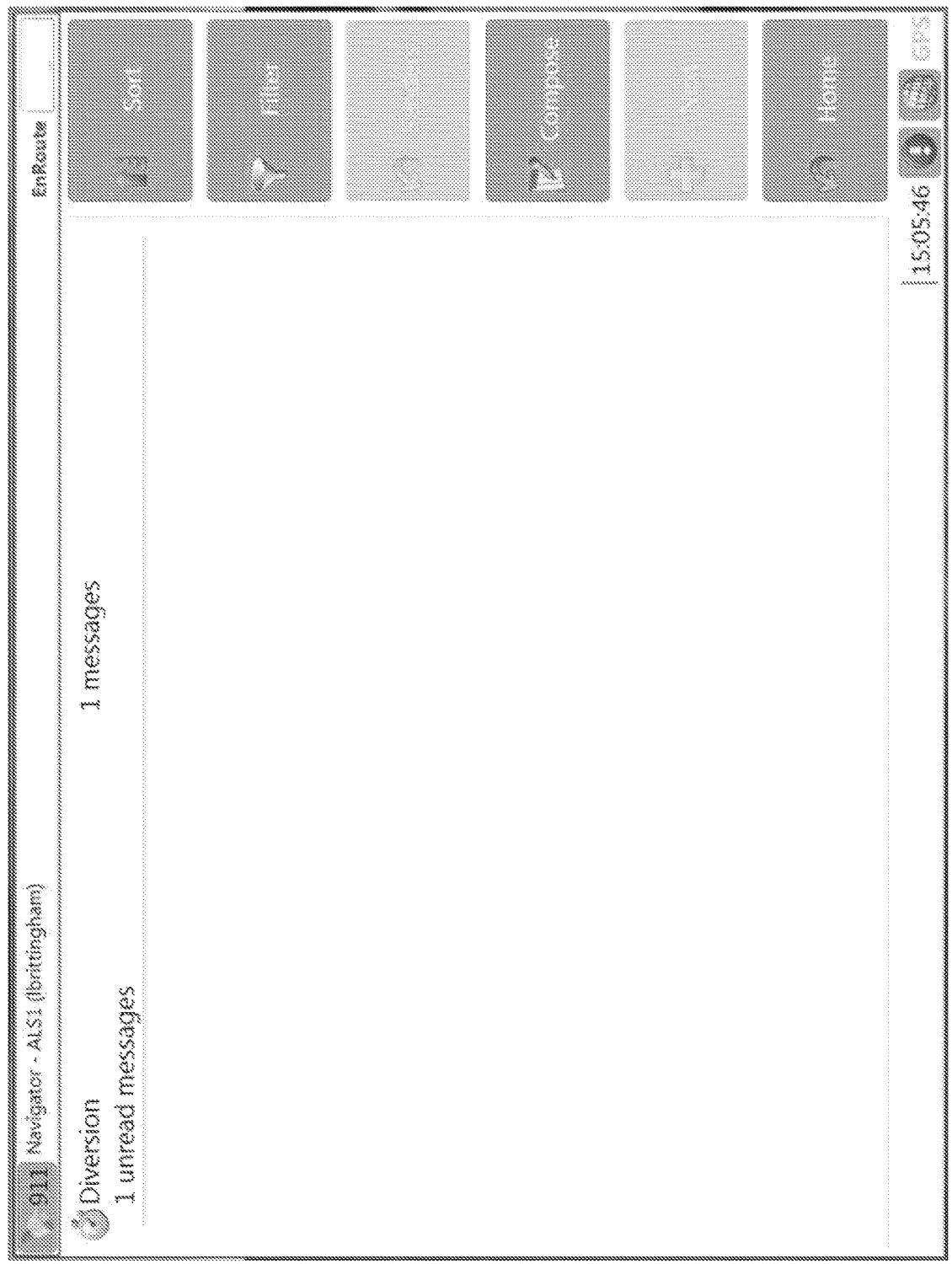
FIG. 17 illustrates a chat messaging screen of an EMS navigation system, according to embodiments of the present invention.
Figure 18:
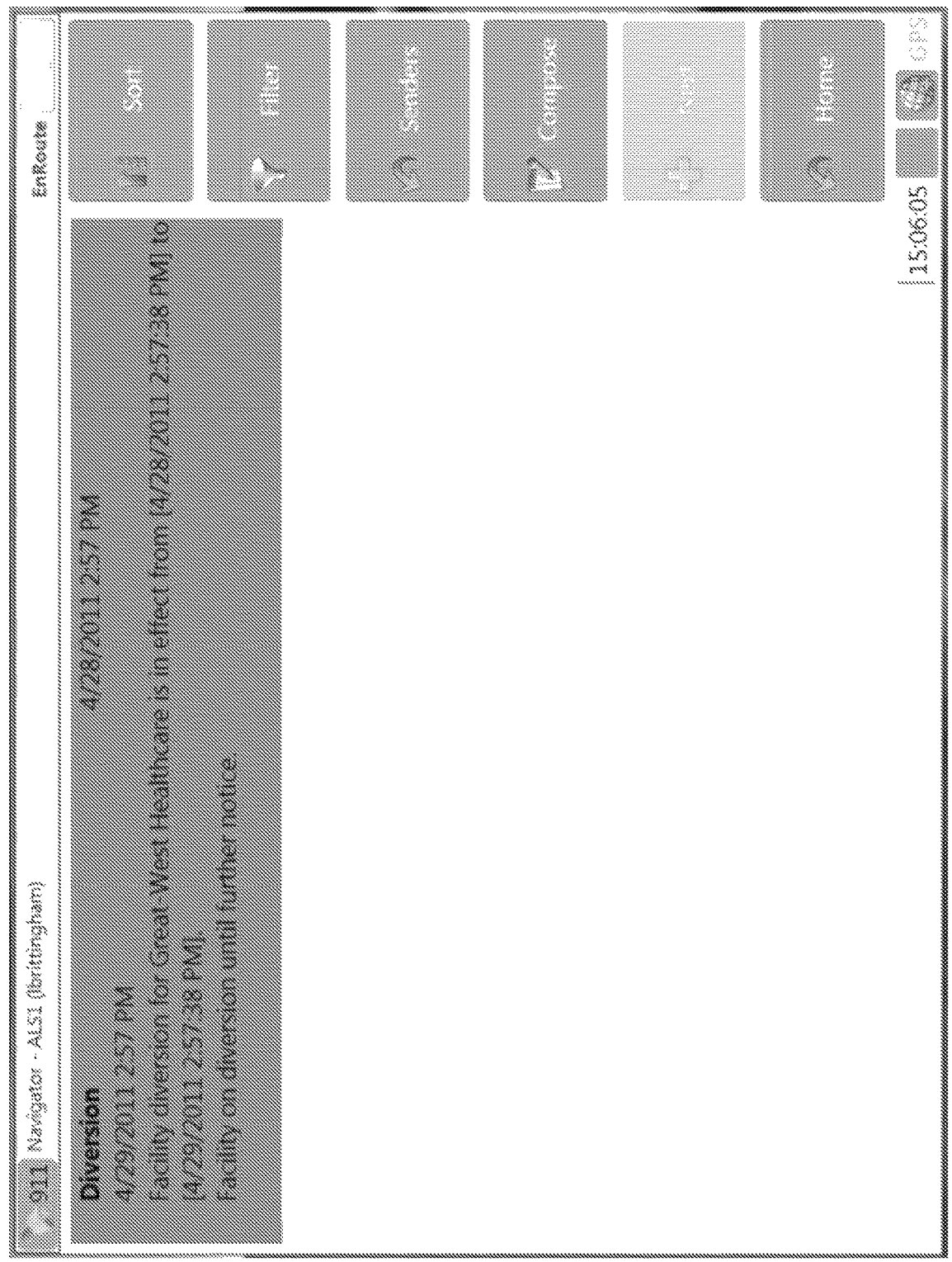
FIG. 18 illustrates a chat messaging details screen of an EMS navigation system, according to embodiments of the present invention.
Figure 19:
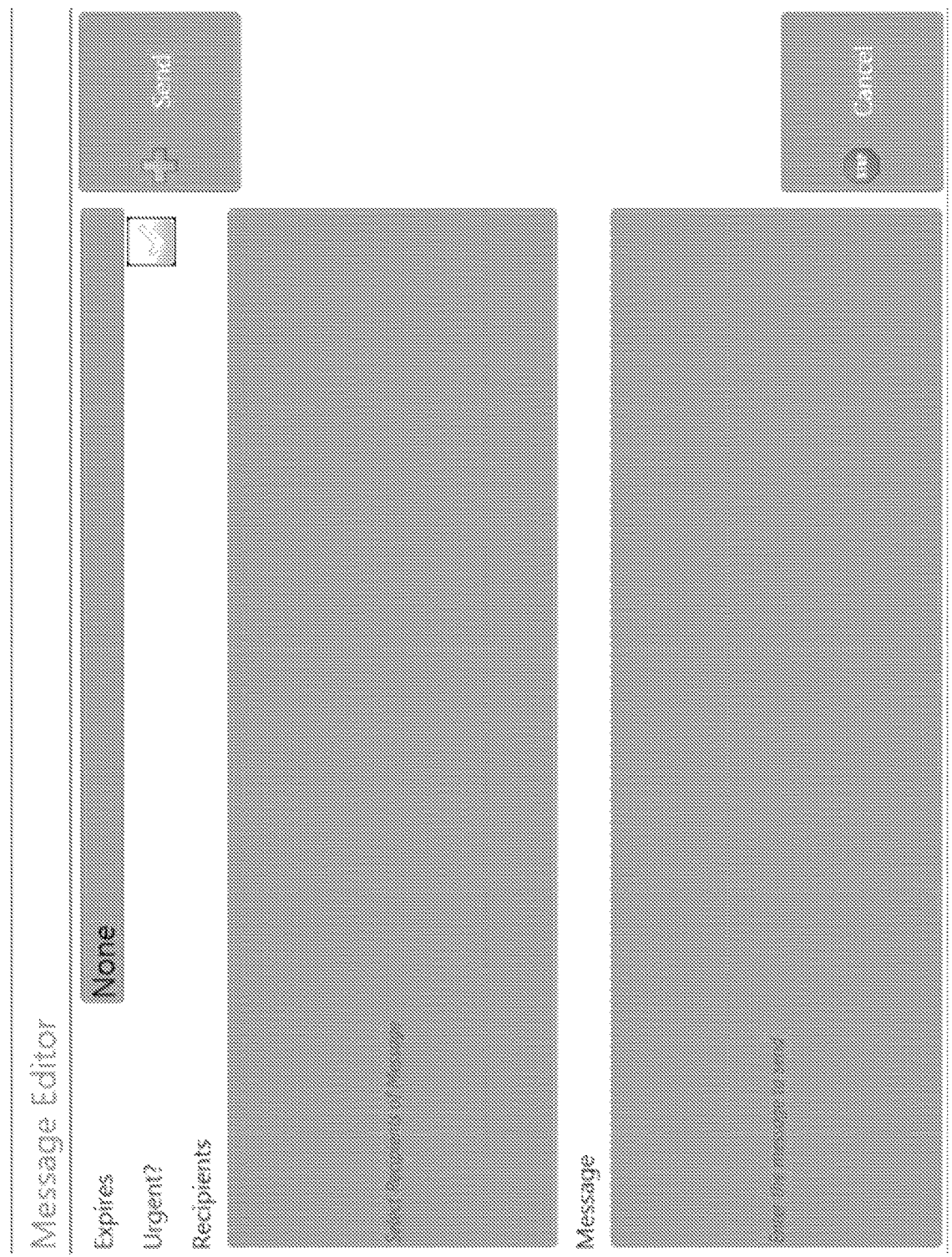
FIG. 19 illustrates a chat messaging editor screen of an EMS navigation system, according to embodiments of the present invention.

From the home menu 406, selecting the Chat Messaging button takes the user to the chat messaging screen 428, illustrated at FIG. 17, which displays a list of facility diversions and textual messages sent to and/or from other units and/or dispatch, according to embodiments of the present invention. From screen 428, selecting a particular message from the list (e.g. by tapping or clicking on it) takes the user to a chat messaging details screen 430, illustrated at FIG. 18, which displays the details for a chat message including when the message was sent, the sender of the message, the full message text, and/or when the message expires (at which time it may be removed from the message list, for example). Selecting the Compose button from screen 428 takes the user to the chat messaging editor screen 432, illustrated at FIG. 19, which displays an editor interface for composing a chat message to send, according to embodiments of the present invention.

Figure 20:
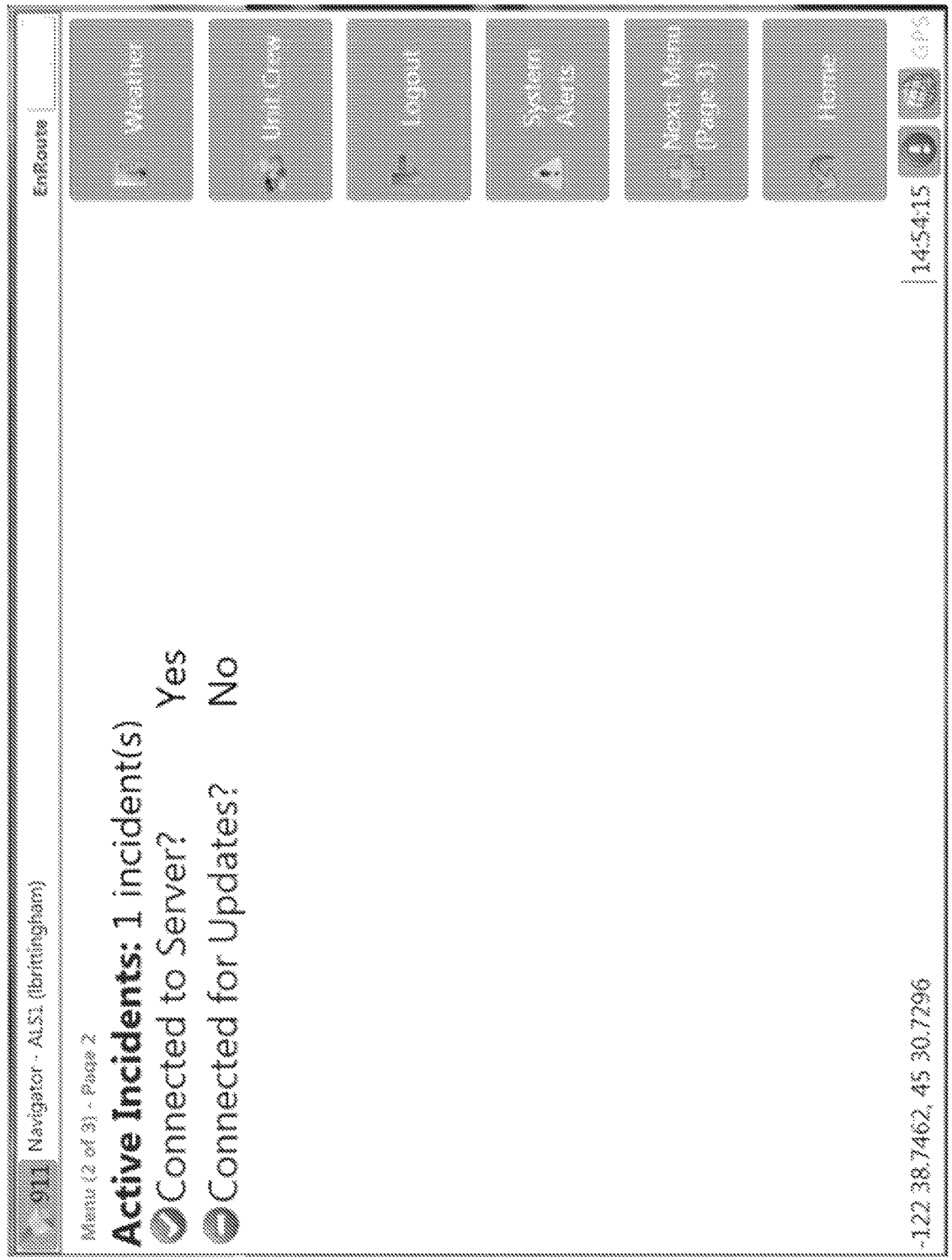
FIG. 20 illustrates a second menu screen of an EMS navigation system, according to embodiments of the present invention.
Figure 21:
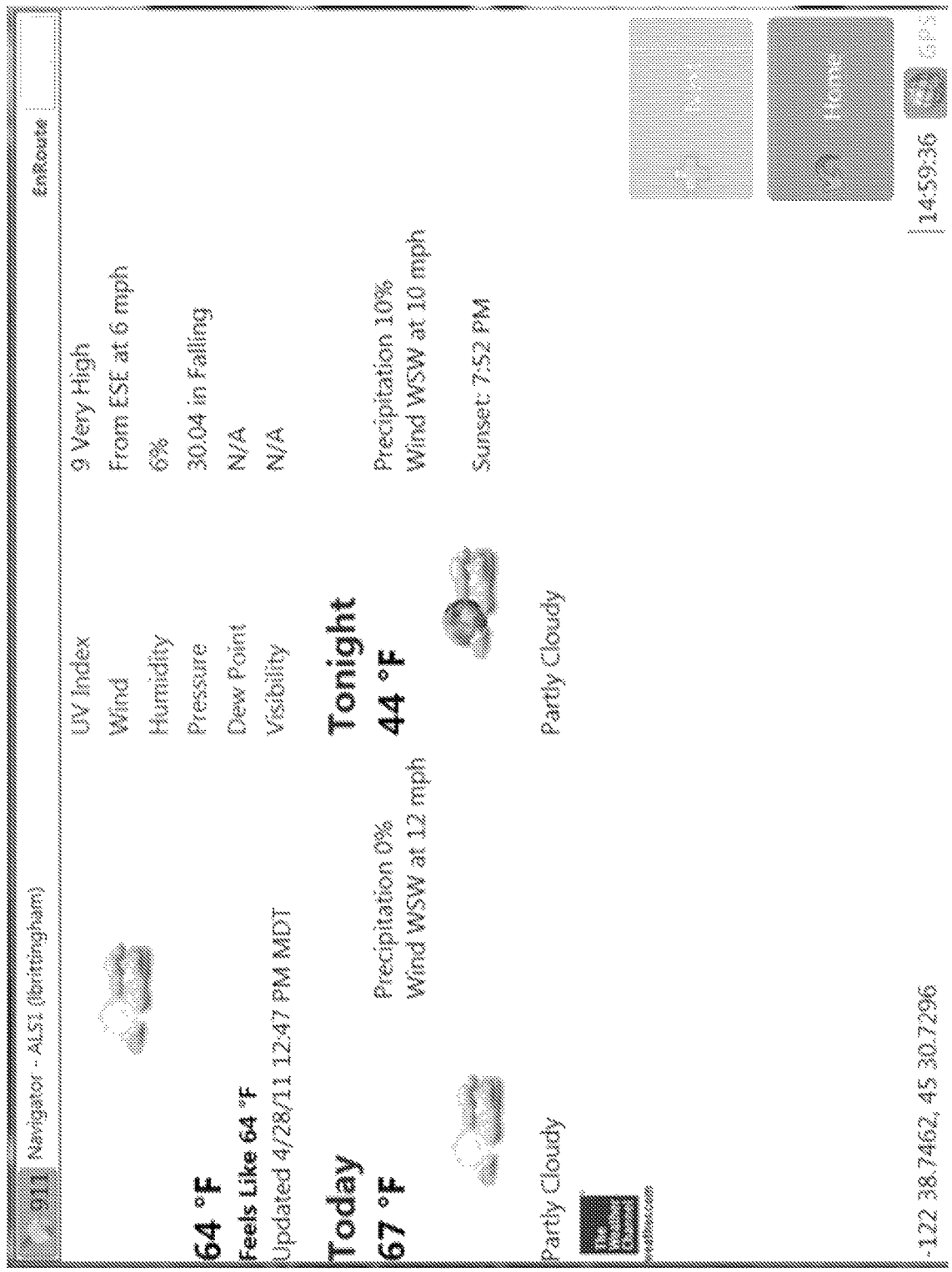
FIG. 21 illustrates a weather screen of an EMS navigation system, according to embodiments of the present invention.

From the home menu 406, selecting the Next:Menu button takes the user to the second menu screen 434, which is illustrated at FIG. 20. Pushing the Weather button from screen 434 takes the user to the weather screen 436, illustrated at FIG. 21, which displays the current weather conditions and/or projected weather conditions for a particular time period or throughout the day, according to embodiments of the present invention. Pushing the Unit Crew button from screen 434 takes the user to the unit crew screen 438 illustrated at FIG. 22, which permits the user to change the vehicle, unit, and additional crew members for the user who is logged in to the system, according to embodiments of the present invention. Pushing the Logout button from screen 434 logs out the current user and takes the user to the login screen. Selecting the System Alerts button from screen 434 takes the user to the system alerts screen 442, illustrated at FIG. 23, which displays any system errors that have occurred, for example when the user-entered time stamp for an incident was rejected because it was already set by dispatch, according to embodiments of the present invention.

Figure 24:
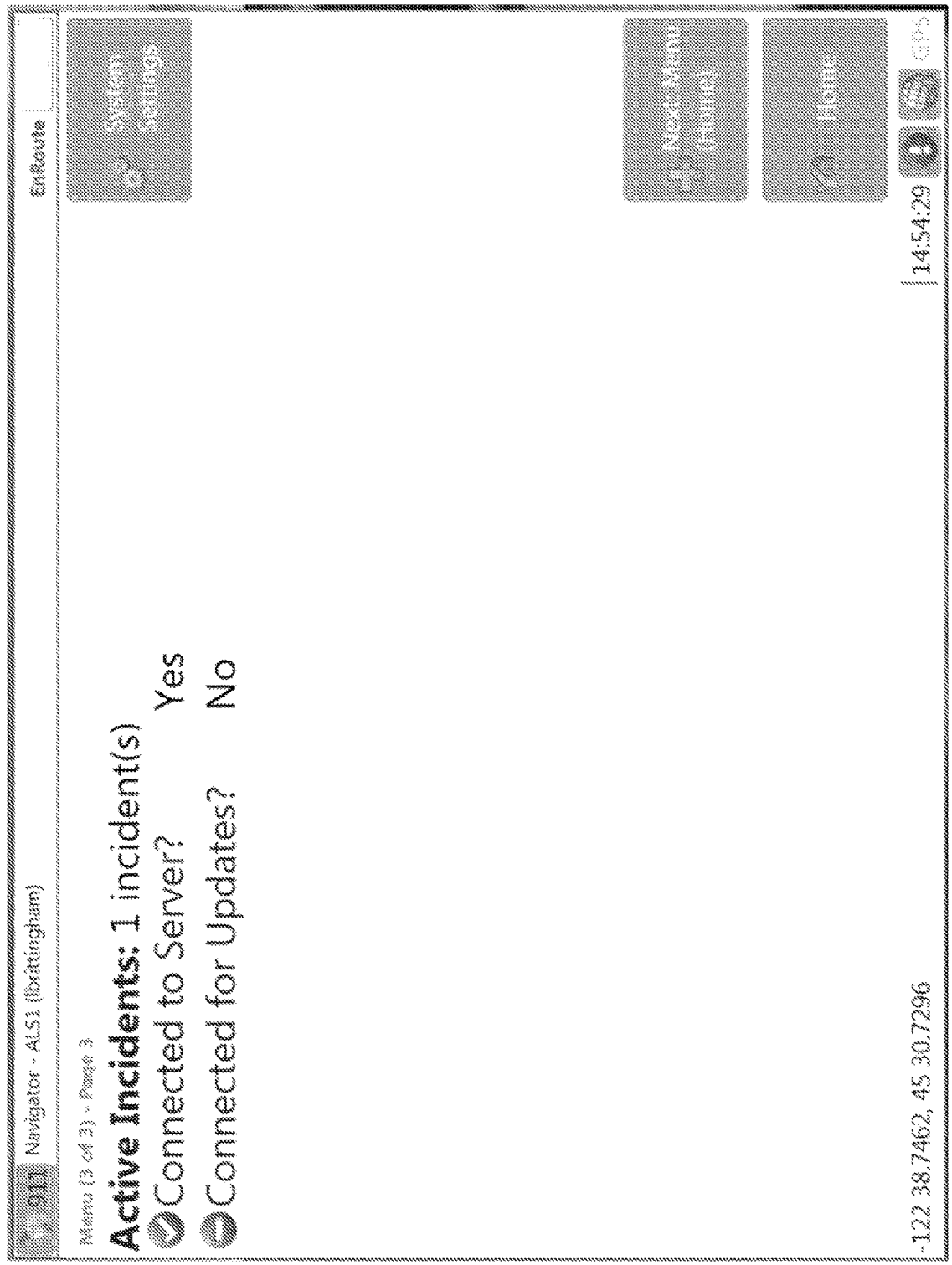
FIG. 24 illustrates a third menu screen of an EMS navigation system, according to embodiments of the present invention.
Figure 25:
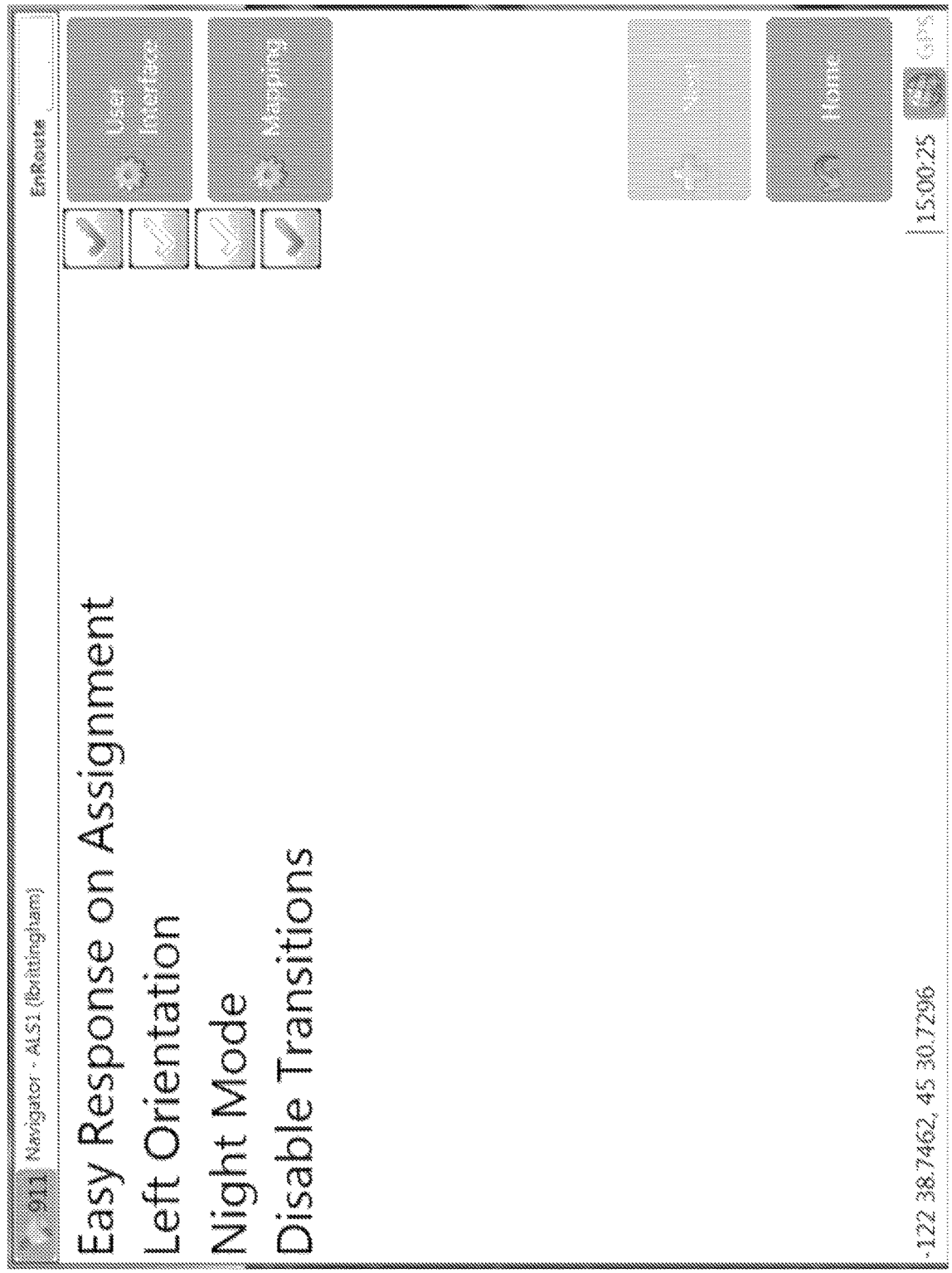
FIG. 25 illustrates a system settings screen of an EMS navigation system, according to embodiments of the present invention.

From the second menu screen 434, selecting the Next:Menu button takes the user to the third menu screen 444, as illustrated at FIG. 24, according to embodiments of the present invention. Selecting the Next:Menu button from screen 444 takes the user back to the home screen 406. Selecting the System Settings button from screen 444 takes the user to system settings screen 446, illustrated at FIG. 25, which allows the user to customize the features and behavior of the application. For example, when the "Easy Response on Assignment" checkbox is activated (e.g. by clicking on or tapping the checkbox), the user is taken immediately to the easy response screen 418 as soon as the easy response button (FIG. 5) is activated. The easy response button screen of FIG. 5 may be color coded to draw attention to the fact that a new incident assignment has been received; for example, the easy response button screen of FIG. 5 may be colored bright red or orange.

The display screens described above show the primary navigation buttons as being of substantially the same size, and/or oriented adjacent to the right side of the screen display device. Activating the "Left Orientation" checkbox in screen 446 switches the orientation and alignment of the primary navigation buttons from the right side to the left side of the screen. This may be done for left-handed users, for example.

Placing the primary navigation buttons against either the right or left sides of the display screen facilitates user of the interface by EMS users. This feature permits an EMS user to place one or more fingers onto the physical device containing the display screen, and use his or her thumb to select the primary navigation buttons, which are rather large (and may be larger than any other buttons on the screens, for example secondary buttons which are not often needed during an incident response). For example, when the navigation buttons are placed adjacent to the right side perimeter of the display screen, a user may place a hand on the side of the device, with the fingers behind the device and/or pointed away from the user, while the user uses the thumb of the hand to navigate the menu structure described with respect to FIG. 4, according to embodiments of the present invention. As such, the user can use the physical device as a reference point, without having to continually visually scan the display to find new button placements and/or to find smaller or more obscure buttons while navigating the screens or pages. The user knows that somewhere near the bottom right of the screen is the lowest button, and somewhere near the top right of the screen is the highest button. This same setup may be employed by placing the buttons along the left side of the screen. According to some embodiments, the buttons may be placed adjacent to either the top or the bottom edge of the screen, depending on the placement and orientation of the navigation device 110, and the particular user's preferences.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for interfacing with a user of an emergency medical services (EMS) navigation device, the method comprising:
   receiving, at the device, an incident assignment from a dispatcher remote from the device, the incident assignment from the dispatcher corresponding to an EMS incident;
   in response to receiving the incident assignment from the dispatcher, displaying only an easy response button with a touch screen communicably coupled with the device, wherein the easy response button captures only an acceptance of the incident assignment, has an area substantially as large as the touch screen, and displays a time that has elapsed since the incident assignment was received from the dispatcher;
   detecting a user's touch anywhere on the easy response button on the touch screen; and
   updating, in response to detecting the user's touch anywhere on the easy response button, a status of the EMS navigation device to indicate that the user is en route to a location associated with the incident assignment.

2. The method of claim 1, further comprising: based on the detection of the user's touch, automatically displaying a map comprising traffic information and a route to a target destination corresponding to the EMS incident.

3. The method of claim 1, wherein updating the status of the EMS navigation device to indicate that response is being made comprises starting a response timer.

4. The method of claim 1, wherein the easy response button displays a nature of the EMS incident and the location associated with the incident assignment.

5. The method of claim 1, wherein displaying the easy response button comprises displaying a nature of the EMS incident.

6. The method of claim 1, wherein displaying the easy response button comprises displaying the location associated with the incident assignment.

7. The method of claim 1, comprising displaying information exclusive of the easy response button prior to the receipt of the incident assignment from the dispatcher.

8. The method of claim 7, comprising automatically replacing the information exclusive of the easy response button with the easy response button in response to receiving the incident assignment from the dispatcher.

9. The method of claim 7, comprising:
receiving login information from the user of the EMS navigation device; and
in response to receiving the login information, displaying the information exclusive of the easy response button.

10. The method of claim 7, wherein displaying the information exclusive of the easy response button comprises displaying one or more of unit crew information, dispatch information, a chat messaging button, and assigned incident information.

11. The method of claim 1, wherein the user's touch anywhere on the easy response button comprises a single touch or tap.

12. A system for emergency medical services (EMS) navigation, the system comprising:
an EMS navigation device configured to receive an incident assignment from a dispatcher remote from the EMS navigation device, the incident assignment from the dispatcher corresponding to an EMS incident; and
a touch screen display device communicably coupled to the EMS navigation device,
the EMS navigation device being configured to, in response to the receipt of the incident assignment from the dispatcher
display only an easy response button with the touch screen display device, wherein the easy response button captures only an acceptance of the incident assignment, has an area substantially as large as the touch screen display device, and displays a time that has elapsed since the incident assignment was received from the dispatcher,
detect a user's touch anywhere on the easy response button on the touch screen display device, and
update, in response to the detection of the user's touch anywhere on the easy response button, a status of the system for EMS navigation to indicate that a user is en route to a location associated with the incident assignment.

13. The system of claim 12, wherein the EMS navigation device is configured to, based on the detection of the user's touch, automatically display a map with the touch screen display device, the map comprising traffic information and a route to a target destination corresponding to the EMS incident.

14. The system of claim 12, wherein the EMS navigation device is configured to begin a response timer based on the detection of the user's touch.

15. The system of claim 12, wherein the easy response button displays a nature of the EMS incident and the location associated with the incident assignment.

16. The system of claim 12, wherein the easy response button displays a nature of the EMS incident.

17. The system of claim 12, wherein the easy response button displays the location associated with the incident assignment.

18. The system of claim 12, wherein the EMS navigation device is configured to provide displayed information exclusive of the easy response button prior to the receipt of the incident assignment from the dispatcher.

19. The system of claim 18, wherein the EMS navigation device is configured to automatically replace the information exclusive of the easy response button with the easy response button in response to the receipt of the incident assignment from the dispatcher.

20. The system of claim 18, wherein the EMS navigation device is configured to provide the displayed information exclusive of the easy response button in response to a receipt of login information from the user of the EMS navigation device.

21. The system of claim 18, wherein the information exclusive of the easy response button comprises one or more of unit crew information, dispatch information, a chat messaging button, and assigned incident information.

22. The system of claim 21, wherein the chat messaging button is configured to capture a user selection of the chat messaging button and wherein, in response to the user selection, the EMS navigation device is configured to provide information comprising at least one text message sent to or received from at least one of the dispatcher and at least one other EMS unit.

23. The system of claim 22, wherein, in response to a user selection of the at least one text message, the EMS navigation device is configured to provide a chat messaging details screen.

24. The system of claim 23, wherein the chat messaging details screen provides at least one of a time the at least one text message was sent, a sender of the at least one text message, and a full message text for the at least one text message.

25. The system of claim 21, wherein the chat messaging button is configured to capture a user selection of the chat messaging button and wherein, in response to the user selection, the EMS navigation device is configured to provide a compose button configured to provide an editor interface for chat messaging in response to a user selection of the compose button.

26. The system of claim 12, wherein the user's touch anywhere on the easy response button comprises a single touch or tap.

27. A system for emergency medical services (EMS) navigation, the system comprising:
an EMS navigation device configured to receive an incident assignment from a dispatcher remote from the EMS navigation device, the incident assignment from the dispatcher corresponding to an EMS incident; and
a touch screen display device communicably coupled to the EMS navigation device,
the EMS navigation device being configured to, in response to the receipt of the incident assignment from the dispatcher
display only an easy response button with the touch screen display device, wherein the easy response button captures only an acceptance of the incident assignment, occupies an area as large as an entirety of the touch screen display device, and displays a time that has elapsed since the incident assignment was received from the dispatcher,
detect a user's touch anywhere on the easy response button on the touch screen display device, and update, in response to the detection of the user's touch anywhere on the easy response button, a status of the system for EMS navigation to indicate that a user is en route to a location associated with the incident assignment.

28. The system of claim 27, wherein the EMS navigation device is configured to, based on the detection of the user's touch, automatically display a map with the touch screen display device, the map comprising traffic information and a route to a target destination corresponding to the EMS incident.

29. The system of claim 27, wherein the EMS navigation device is configured to begin a response timer based on the detection of the user's touch.

30. The system of claim 27, wherein the easy response button displays a nature of the EMS incident and the location associated with the incident assignment.

31. The system of claim 27, wherein the easy response button displays a nature of the EMS incident.

32. The system of claim 27, wherein the easy response button displays the location associated with the incident assignment.

33. The system of claim 27, wherein the EMS navigation device is configured to provide displayed information exclusive of the easy response button prior to the receipt of the incident assignment from the dispatcher.

34. The system of claim 33, wherein the EMS navigation device is configured to automatically replace the information exclusive of the easy response button with the easy response button in response to the receipt of the incident assignment from the dispatcher.

35. The system of claim 33, wherein the EMS navigation device is configured to provide the displayed information exclusive of the easy response button in response to a receipt of login information from the user of the EMS navigation device.

36. The system of claim 33, wherein the information exclusive of the easy response button comprises one or more of unit crew information, dispatch information, a chat messaging button, and assigned incident information.

37. The system of claim 27, wherein the user's touch anywhere on the easy response button comprises a single touch or tap.

* * * * *